(12) United States Patent
Calley

(10) Patent No.: US 11,242,104 B2
(45) Date of Patent: Feb. 8, 2022

(54) MOTORCYCLE LEAN ANGLE INDICATION DEVICE, SYSTEM AND METHOD

(71) Applicant: Jason Calley, Kingwood, TX (US)

(72) Inventor: Jason Calley, Kingwood, TX (US)

( * ) Notice: Subject to any disclaimer, the term of this patent is extended or adjusted under 35 U.S.C. 154(b) by 0 days.

(21) Appl. No.: 16/945,751

(22) Filed: Jul. 31, 2020

(65) Prior Publication Data
US 2021/0031856 A1  Feb. 4, 2021

Related U.S. Application Data

(60) Provisional application No. 62/882,518, filed on Aug. 3, 2019.

(51) Int. Cl.
*B62J 45/415* (2020.01)
*B62J 50/21* (2020.01)
*G05D 3/12* (2006.01)

(52) U.S. Cl.
CPC .......... *B62J 45/4151* (2020.02); *B62J 50/21* (2020.02); *G05D 3/125* (2013.01)

(58) Field of Classification Search
CPC ........ B62H 7/00; B62J 23/00; B62J 45/4151; B62J 45/42; B62J 50/21; B62J 50/23; G05D 3/125
See application file for complete search history.

(56) References Cited

U.S. PATENT DOCUMENTS

| | | | | |
|---|---|---|---|---|
| 3,902,740 A * | 9/1975 | Lucier | ...................... | B62J 23/00 280/304.3 |
| 6,179,313 B1 * | 1/2001 | Christensen | ............. | B62J 21/00 180/219 |
| 6,637,787 B1 * | 10/2003 | Salvisberg | ............... | B62J 23/00 180/219 |
| 6,758,484 B1 * | 7/2004 | Rice | ......................... | B62J 27/00 180/219 |
| 6,910,704 B1 * | 6/2005 | Celiceo | ..................... | B62J 23/00 280/304.4 |
| 6,971,462 B2 * | 12/2005 | Ito | .......................... | B60K 11/06 180/229 |
| 7,178,858 B1 * | 2/2007 | Hesse | ...................... | B62J 17/06 296/180.1 |
| 7,658,395 B2 * | 2/2010 | Bagnariol | ................ | B62J 27/00 280/304.3 |
| 8,235,419 B1 | 8/2012 | Giarrusso | | |
| 8,636,295 B2 * | 1/2014 | Roziere | .................... | B62J 27/00 280/293 |
| 10,384,738 B1 | 8/2019 | Toler | | |
| 2004/0098185 A1 * | 5/2004 | Wang | ..................... | B62D 37/06 701/70 |
| 2005/0212254 A1 * | 9/2005 | Heitner | .................... | B62H 1/10 280/298 |
| 2009/0108560 A1 * | 4/2009 | Mountz | .................... | B62J 25/00 280/291 |
| 2016/0185410 A1 * | 6/2016 | Khoda | ................... | B62K 11/04 280/304.3 |

* cited by examiner

*Primary Examiner* — Hunter B Lonsberry
*Assistant Examiner* — Daniel L Greene
(74) *Attorney, Agent, or Firm* — The Compton Law Firm. P.C.; Scott D. Compton

(57) ABSTRACT

The present disclosure is directed to lean angle indication for motorcycles. The disclosure provides a motorcycle lean angle indication device that is operationally configured to be attached to a motorcycle and contact a surface that a motorcycle is traveling upon when the motorcycle realizes a target lean angle when executing a turning maneuver.

10 Claims, 25 Drawing Sheets

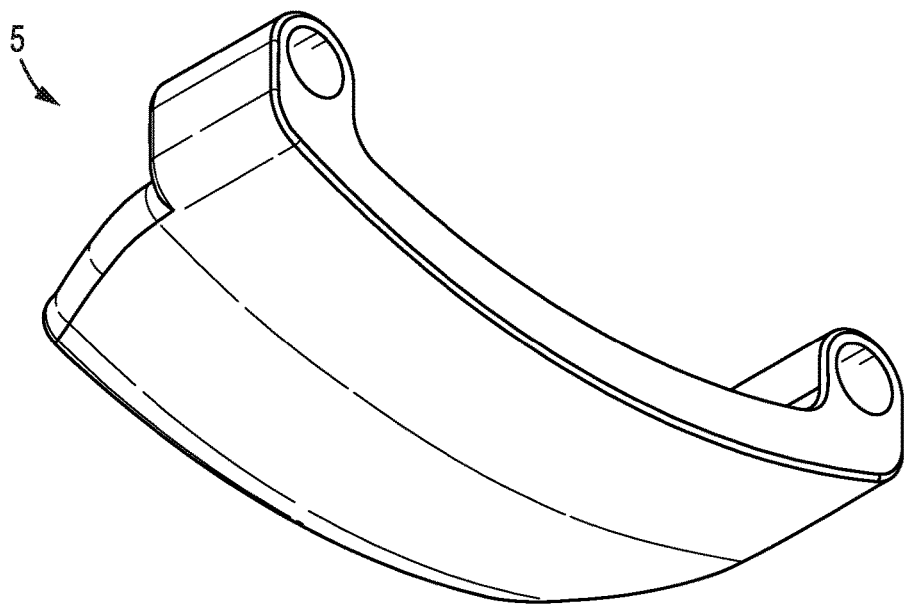
FIG. 25
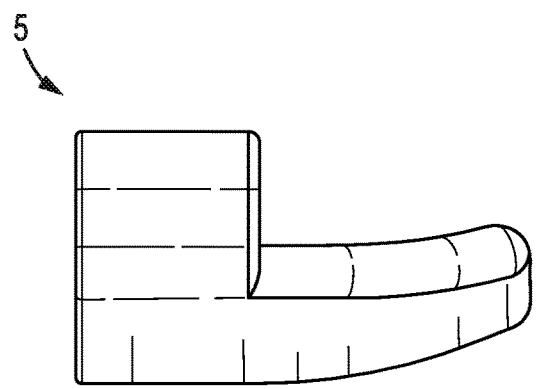 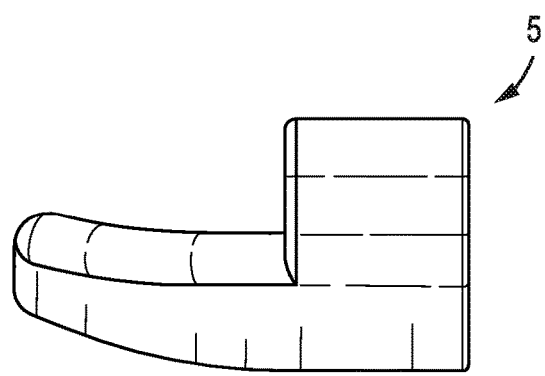
FIG. 26     FIG. 27

MOTORCYCLE LEAN ANGLE INDICATION DEVICE, SYSTEM AND METHOD

CROSS-REFERENCE TO RELATED APPLICATIONS

This application claims benefit of U.S. Provisional Patent Application Ser. No. 62/882,518, filed on Aug. 3, 2019, the content of which is hereby incorporated by reference in its entirety.

STATEMENT REGARDING FEDERALLY SPONSORED RESEARCH OR DEVELOPMENT

Not applicable.

BACKGROUND OF THE DISCLOSURE

1. Field of the Invention

This disclosure relates generally in the field of lean angle indication for riders of motorcycles.

2. Background Art

Several factors limit the speed at which a motorcyclist can traverse a curve, for example, (1) the limit of available friction between motorcycle tires and a travel surface of the motorcycle; (2) a lean angle at which one or more components of a motorcycle come into contact with a travel surface or other surface upon which the motorcycle is traveling (hereafter referred to as a "contact lean angle" of a motorcycle; and (3) a motorcyclist's psychological limits as to approaching either the geometric or friction limits of his/her motorcycle. In certain instances the development of slow speed motorcycle curve and U-turn maneuvering at or about 32.2 km/h (20.0 mph) or less may be extremely difficult to develop and perform due to the weight of particular motorcycles, for example, motorcycles of or about 226.8 kg (500.0 pounds) or more. For instance, many motorcyclists who operate large touring style motorcycles including, but not necessarily limited to Harley Davidson® Touring Class motorcycles, e.g., the ROAD KING®, FLH Street Glide, or Road Glide, and the Honda® Gold Wing®, lack the ability to execute simple riding skills such as leaning, turning or maneuvering the motorcycle for obstacle avoidance and other riding skills including slow speed turns and U-turns without having to walk the motorcycle with their feet (duck walk the motorcycle), in order to make a particular turn of the motorcycle. Oftentimes, the lack of slow speed skills of motorcyclists, especially those persons riding large heavy touring type motorcycles, results from a fear of dropping the motorcycle and/or damaging motorcycle parts, e.g., engine guards or bars, saddlebag guards or bars, saddlebags, toe shift levers, kickstands, footboards, heat shields, outer primary covers, derby covers, and combinations thereof, while maneuvering the motorcycle at slower speeds.

Learning maneuvering skills including slow speed motorcycle maneuvering skills, such as slow speed turns, enables a motorcyclist to learn a maximum lean angle for his/her particular motorcycle and allows for better control of a motorcycle at higher speeds wherein a motorcyclist may have to react and respond to road conditions and other on-road incidents that require leaning, turning and/or swerving of the motorcycle, e.g., obstacle avoidance and emergency braking. Therefore, a need exists to train motorcyclists to learn or otherwise identify one or more particular lean angles including a maximum lean angle for motorcycles of interest without the fear of dropping the motorcycle and/or damaging the motorcycle when traveling at slow speeds.

SUMMARY OF THE DISCLOSURE

The present disclosure is directed to a method of indicating to a rider of a motorcycle when the motorcycle has reached a target lean angle in a target lean direction from a vertical position of the motorcycle, comprising (1) providing a device releasably attachable to the motorcycle in a manner effective for the device to contact an operating surface of the motorcycle when the motorcycle has realized the target lean angle in the target lean direction; and (2) maneuvering the motorcycle in the target lean direction until the device contacts the operating surface of the motorcycle. Suitably, the device has one or more fastener members for releasably attaching the device to the motorcycle via one or more fasteners and a deflective member secured to the one or more fastener members, wherein the deflective member is spaced apart from the motorcycle providing a deflection gap between the deflective member and the motorcycle.

The present disclosure is also directed to a method of indicating to a rider of a motorcycle when the motorcycle has reached an operable maximum lean angle in a target lean direction from a vertical position of the motorcycle, comprising (1) providing a device releasably attachable to an outer primary cover of a motorcycle in a manner effective for the device to contact an operating surface of the motorcycle when the motorcycle has realized the operable maximum lean angle in the target lean direction, the device having one or more fastener members for releasably attaching the device to the outer primary cover via one or more fasteners and a deflective member secured to the one or more fastener members, wherein the deflective member is spaced apart from the outer primary cover providing a deflection gap of a first distance between the deflective member and the outer primary cover; and (2) maneuvering the motorcycle in the target lean direction until the device contacts the operating surface of the motorcycle. In one embodiment, the deflective member may be operationally configured to deflect a distance less than the first distance when the deflective member contacts the operating surface. In one embodiment, the deflective member may be operationally configured to deflect up to 5.0 degrees.

The present disclosure is also directed to a system for teaching motorcyclists to identify one or more target lean angles in one or more target lean directions from a vertical position of a motorcycle when executing turning maneuvers on the motorcycle, comprising one or more lean angle indication devices for a motorcycle, each of the one or more lean angle indication devices having a (1) one or more fastener members operationally configured to releasably attach to the motorcycle via one or more fasteners and a (2) deflective member secured to the one or more fastener members, wherein each of the one or more lean angle indication devices is operationally configured to releasably attach to a motorcycle in a manner effective to contact an operating surface of the motorcycle at a different lean angle of the motorcycle.

BRIEF DESCRIPTION OF THE SEVERAL VIEWS OF THE DRAWING

FIG. 25 is a bottom perspective view of the lean angle indication device of FIG. 20.

FIG. 26 is a right side view of the lean angle indication device of FIG. 20.

FIG. 27 is a left side view of the lean angle indication device of FIG. 20.

DEFINITIONS USED IN THE DISCLOSURE

Figure 1:
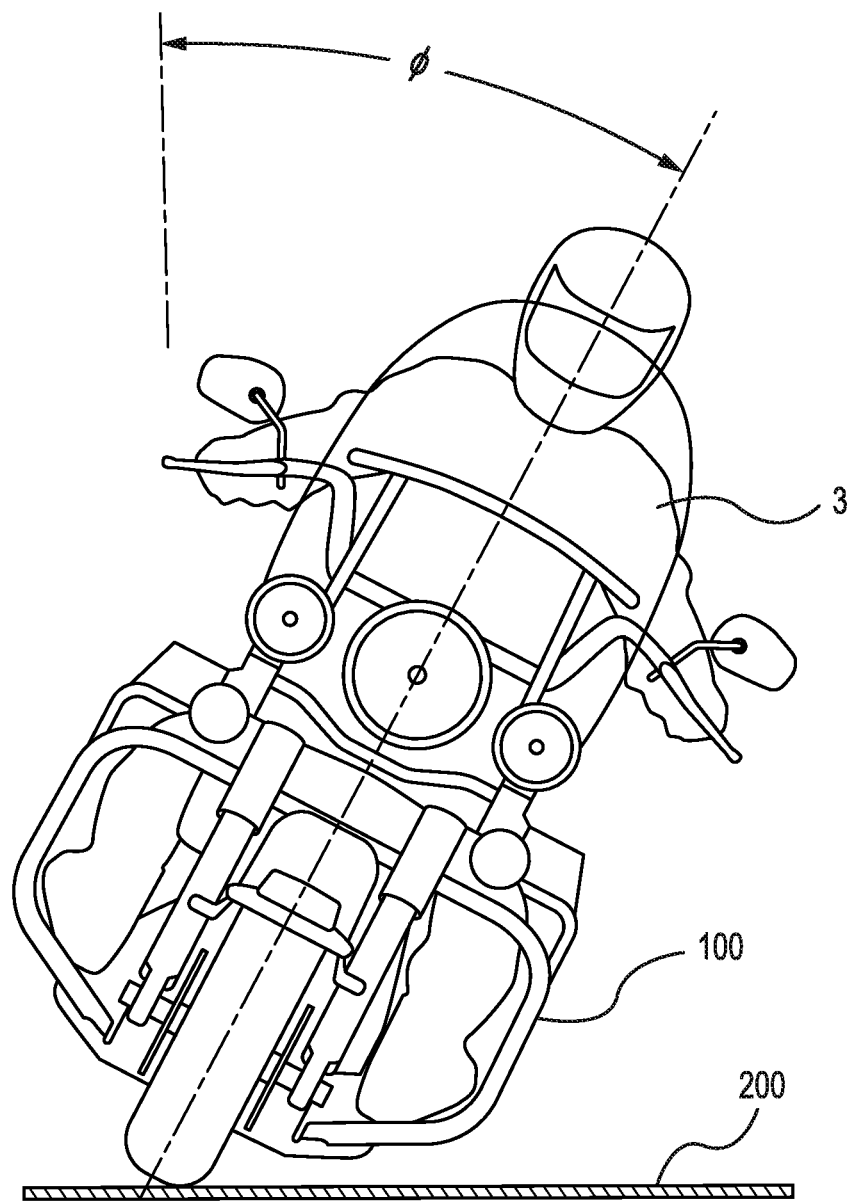
FIG. 1 is a front view of a motorcyclist riding a motorcycle illustrating a center line of the motorcycle at a lean angle in a left lean direction from a vertical position of the motorcycle.

The term "at least one", "one or more", and "one or a plurality" mean one thing or more than one thing with no limit on the exact number; these three terms may be used interchangeably within this disclosure. For example, at least one device means one or more devices or one device and a plurality of devices.

The term "about" means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value.

The term "substantially" or "essentially" means that a value of a given quantity is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

DETAILED DESCRIPTION OF THE DISCLOSURE

For the purposes of promoting an understanding of the principles of the disclosure, reference is now made to the embodiments illustrated in the drawings and particular language will be used to describe the same. It is understood that no limitation of the scope of the claimed subject matter is intended by way of the disclosure. As understood by one skilled in the art to which the present disclosure relates, various changes and modifications of the principles as described and illustrated are herein contemplated.

The present disclosure is not limited to particular embodiments. Also, it is to be understood that the terminology used herein is for the purpose of describing particular embodiments only, and is not intended to be limiting. As used in this specification and the appended claims, the term "motorcycle" refers to a two-wheeled motorcycle as understood by the skilled artisan, including gas powered motorcycles, electric powered motorcycles and hybrid motorcycles. The term "motorcyclist" refers to a person operating a motorcycle. The term "rider" may be used interchangeably with the term motorcyclist. One non-limiting example of a motorcycle is provided in U.S. Patent Application Number US20200156717A1, titled "Gyroscopic Rider Assist Device," published May 21, 2020, which is herein incorporated by reference in its entirety. Another non-limiting example of a motorcycle is provided in U.S. Pat. No. 8,851,499, titled "Electronically Retractable Motorcycle Wheel Stabilizer Device," issued Oct. 7, 2014, which is herein incorporated by reference in its entirety. Another non-limiting example of a motorcycle is provided in U.S. Pat. No. 10,183,717, titled "Two-Wheeled Vehicle," issued Jan. 22, 2019, which is herein incorporated by reference in its entirety. Another non-limiting example of a motorcycle is provided in U.S. Pat. No. 9,543,598, titled "Fuel Cell-Powered Motorcycle," issued Jan. 10, 2017, which is herein incorporated by reference in its entirety. Another non-limiting example of a motorcycle is provided in U.S. Pat. No. 8,556,019, titled "Hybrid Saddle-Type Vehicle," issued Oct. 15, 2013, which is herein incorporated by reference in its entirety.

Herein, a road surface or other support surface upon which a motorcycle is traveling or parked, e.g., the ground, a driveway, a parking lot, a floor, a stage, a flat trailer bed, and the like, may be referred to as an "operating surface" of a motorcycle. As shown in FIG. 1, a motorcycle 100 may lean from a vertical position left and/or right in order to perform various turning maneuvers, e.g., U-turns, S-shaped curve maneuvers. As understood by the skilled artisan, the degree of lean angle from a vertical position in a target lean direction for a motorcycle 100 may vary according to a particular turning maneuver to be performed. For example, certain turning maneuvers for a motorcycle 100 may require less than a maximum lean angle of the motorcycle 100 in order to successfully achieve such turning maneuvers while other turning maneuver may require a maximum lean angle in order to successfully achieve certain turning maneuvers. As understood by the skilled artisan, a maximum lean angle of a motorcycle 100 may vary according to the radius and the slope of one or more particular curved operating surfaces requiring turning of the motorcycle 100. Herein, the phrase "maximum lean angle" may be defined as the maximum degree of lean of a motorcycle from a vertical position to a lean angle in a target lean direction just prior to realizing a contact lean angle of the motorcycle 100 according to one or more conditions of an operating surface. As such, a maximum lean angle may include a range of lean angles as described below. As understood by the skilled artisan, maximum lean angle is not equal for every segment of motorcycle and typically varies according to the make and/or model of motorcycle and tire construct. Herein, the phrase "maximum lean angle" may be used interchangeably with the phrase "maximum lean limit." As understood by the skilled artisan, "mph" refers to miles per hour and "km/h" refers to kilometers per hour. As understood in engineering, the term "deflection" and like terms as used herein refers to the degree to which a structural element is displaced under a load. Deflection may refer to an angle or a distance. Herein, "maneuvering" and/or "operating" a motorcycle 100 may be used interchangeably with "riding" a motorcycle 100.

in one embodiment, the present disclosure is directed to a motorcycle 100 lean angle indication device operationally configured to inform a motorcyclist 3 when his/her motorcycle 100 has achieved a particular lean angle or "target lean angle." In one non-limiting example, beginning motorcyclists 3 are often hesitant to lean a motorcycle 100 even a slight amount, e.g., five (5.0) degrees, especially when operating large and/or heavy motorcycles of or about 500.0 pounds or more. As such, a lean angle indication device as described herein may be operationally configured to contact an operating surface when a motorcycle 100 realizes or reaches a particular target lean angle in a manner effective to inform a motorcyclist 3 when such target lean angle is realized. Oftentimes, a particular lean angle feels more extreme in real time to a beginning motorcyclist 3 than the lean angle is and a beginning motorcyclist 3 may feel that he/she is about to drop the motorcycle 100 when he/she can actually lean the motorcycle 100 further successfully without dropping the motorcycle 100 prior to realizing a contact lean angle of the motorcycle 100.

In one implementation, a lean angle indication device may be employed to train a motorcyclist 3 to increase the lean angle of a motorcycle 100 for one or more turning maneuvers incrementally over time by adjusting the moment that the lean angle indication device contacts an operating surface when performing one or more turning maneuvers. In one embodiment, a lean angle indication device may be reshaped or bent in order to change the target lean angle of a motorcycle 100 when the lean angle indication device contacts an operating surface. In another embodiment, a plurality of different size and/or shape fasteners may be employed for releasably attaching a lean angle indication device to a motorcycle 100 in a manner effective to change the target lean angle of the motorcycle 100 when the lean angle indication device contacts an operating surface. In another embodiment, a plurality of lean angle indication devices may be employed to adjust a target lean angle of a motorcycle 100 incrementally over time, each individual lean angle indication device contacting an operating surface at a different target lean angle of the motorcycle 100.

In general, once a motorcycle 100 is leaned beyond its maximum lean angle the gyroscopic effect of the motorcycle 100 is lost causing a motorcyclist 3 to lose balance and control of his/her motorcycle 100—a scenario often realized by novice or beginner motorcyclists 3 attempting slow speed turning maneuvers such as turns at or about 32.2 km/h (20.0 mph) or less, or at or about 24.1 km/h (15.0 mph) or less, or at or about 161 km/h (10.0 mph) or less. As such, in another embodiment the present disclosure is directed to a motorcycle maximum lean angle indication device or maximum lean limit indication device operationally configured to assist motorcyclists 3 in identifying and operating at or near a maximum lean angle of a particular motorcycle 100.

In another embodiment, the present disclosure is directed to a device operationally configured to assist motorcyclists 3 in identifying and operating at or near a maximum lean limit of a particular motorcycle 100 for purposes of motorcycle skills competition riding, e.g., law enforcement and/or civilian motorcycle skills competitions.

In another embodiment, the present disclosure is directed to a maximum lean angle indication device releasably attachable to a motorcycle 100 and operationally configured to contact an operating surface in a manner effective to convey to a motorcyclist 3 that a maximum lean angle, which may include a lean angle less than but functionally close to a maximum lean angle of the motorcycle 100 has been realized for his/her motorcycle 100. As understood by persons of ordinary skill in the art of motorcycle skills competition riding (hereafter "competition riding"), the contact lean angle of a particular motorcycle 100 in competition riding may be greater than the contact lean angle of the same motorcycle 100 used by the general public because motorcycles used in competition riding often execute slow turning maneuvers requiring a greater maximum lean angle than motorcycles operated by the general public on public thoroughfares and the like. As such, a maximum lean angle indication device of this disclosure may be operationally configured to provide maximum lean angle indication for competition riding and/or operationally configured to provide maximum lean angle indication for general public use. As understood by the skilled artisan, motorcyclists 3 proficient at maneuvering a motorcycle 100 in competition riding are commonly referred to as "expert" motorcyclists, although such experience is not necessarily required in order to perform the more difficult slow turning maneuvers on a motorcycle 100 as often encountered in competition riding.

Herein, contact of a maximum lean angle indication device against an operating surface may be defined as providing an "operable maximum lean angle" of a motorcycle 100. Without limiting the disclosure, in one embodiment an operable maximum lean angle may be provided within a range that defines a maximum lean angle for a particular motorcycle 100, e.g., a range from or about 1.0 degree to or about 3.0 degrees less than a contact lean angle of a motorcycle 100.

The present disclosure is also directed to a lean angle indication device operationally configured as a deflective device. Suitably, at least part of the lean angle indication device may be spaced apart from one or more components of a motorcycle 100 in a manner effective to deflect without contacting the one or more components of a motorcycle 100 once the lean angle indication device contacts an operating surface under load, which suitably prevents or otherwise minimizes physical damage to the one or more components of the motorcycle 100. In addition to the load placed on a lean angle indication device, the amount of deflection of a lean angle indication device may also be determined according to the one or more materials of construction of the lean angle indication device and/or the type of motorcycle 100 using the lean angle indication device and/or the configuration of the lean angle indication according to a target lean angle of the motorcycle 100. As such, and without limiting the disclosure, in one embodiment a maximum amount of deflection of a lean angle indication device may be of or about 5.0 degrees.

In another embodiment, the present disclosure is directed to a maximum lean angle indication device operationally configured as a deflective device when an operable maximum lean angle of a motorcycle 100 is realized. In order to teach, train, develop or practice maximum lean indication without the fear of dropping a motorcycle 100 and/or damaging a motorcycle 100, e.g., when a motorcycle 100 is traveling at slow speeds of 20.0 mph or less, a suitable operable maximum lean angle of a maximum lean angle indication device may range as stated above, from or about 1.0 degree to or about 3.0 degrees less than a contact lean angle of the corresponding motorcycle 100 and the maximum lean angle indication device may include a maximum deflection from or about 0.5 degree to or about 2.5 degrees.

In another embodiment, the present disclosure is directed to a lean angle indication device releasably attachable to an outer primary cover of a motorcycle 100. As understood by the skilled artisan, an outer primary cover of a motorcycle 100 is a removable cover for components such as the clutch assembly including the compensator sprocket, rear clutch basket, and chain. In certain instances when a motorcycle 100 tips over or realizes a contact lean angle, the outer primary cover contacts an operating surface and/or debris on the operating surface causing damage to the outer primary cover, whereby the outer primary cover may have to be replaced due to functional damage and/or cosmetic damage. As such, a lean angle indication device of the present disclosure may be releasably attached to an outer primary cover of a motorcycle 100 as both a maximum lean indication device and as a deflective device protective guard operationally configured to prevent one or more portions of an outer primary cover and other components of the motorcycle 100 from contacting an operating surface and/or debris thereon in instances when a motorcycle 100 exceeds its maximum lean angle.

In another embodiment, the present disclosure is directed to a lean angle indication device operationally configured to be affixed to an outer surface of a motorcycle 100 at one or more target locations of a motorcycle 100.

In another embodiment, the present disclosure is directed to a system including a plurality of lean angle indication devices including one or more lean angle indication devices releasably attached to a right side of a motorcycle 100 and one or more lean angle indication devices releasably attached to a left side of the motorcycle 100.

In another embodiment, the present disclosure is directed to a method of identifying when a target lean angle of a motorcycle 100 in a left leaning direction and/or a right leaning direction is realized, the method comprising providing a lean angle indication device and attaching the lean angle indication device to a motorcycle 100 in a manner effective for the lean angle indication device to contact an operating surface of the motorcycle 100 when the motorcycle 100 has realized a target lean angle.

In another embodiment, the present disclosure is directed to one or more lean angle indication devices operationally configured to be releasably attached to one or more outer surface locations of a motorcycle 100 including, but not necessarily limited to a motorcycle frame, a footboard, a foot peg, a saddlebag bar, an outer primary cover, a derby cover, an engine guard, a saddlebag guard, a heat shield, a toe shift lever, a kickstand, and combinations thereof.

In another embodiment, the present disclosure is directed to a lean angle indication device for use with a derby cover of an outer primary cover of a motorcycle 100.

In another embodiment, the present disclosure is directed to a lean angle indication device releasably attachable to an outer primary cover of a motorcycle 100 that does not detract from the overall appearance of or alter the normal operation of the motorcycle 100.

In another embodiment, the present disclosure is directed to a lean angle indication device releasably attachable to a derby cover of an outer primary cover of a motorcycle 100 that does not detract from the overall appearance of or alter the normal operation of the motorcycle 100.

In another embodiment, the present disclosure is directed to a lean angle indication device operable with a plurality of motorcycle 100 outer primary covers. Also, a lean limit indication device of this disclosure may be built to scale.

In another embodiment, the present disclosure is directed to a lean angle indication device operable with a plurality of motorcycle 100 derby covers of a plurality of outer primary covers.

In another embodiment, the disclosure provides an adjustable lean angle indication device for use with a plurality of motorcycle 100 outer primary covers.

In another embodiment, the disclosure provides an adjustable lean angle indication device for use with a plurality of motorcycle 100 derby covers as may be available for a plurality of outer primary covers.

In another embodiment, the disclosure provides a lean angle indication device that may be operationally configured for use with one or more target outer primary covers of one or more make and model motorcycles. In another embodiment, the disclosure provides a lean angle indication device that may be operationally configured for use with one or more target derby covers of outer primary covers of one or more make and model motorcycles. Suitable motorcycles provided with target outer primary covers and/or target derby covers are commercially available from sources including, but not necessarily limited to Harley-Davidson Motor Company, Milwaukee, Wis., U.S.A.; Indian Motorcycle International, L.L.C., Medina, Minn., U.S.A.; Yamaha Motor Corporation, U.S.A., Kennesaw, Ga., U.S.A.; Kawasaki Motors Corp., U.S.A., Foothill Ranch, Calif., U.S.A.

As understood by persons of ordinary skill in the art of motorcycle riding, the gyroscopic effect of a motorcycle 100 is negatively affected when the revolutions per minute ("RPM") of the motorcycle tires are lowered during slow speed maneuvers to about 1200.00-1500.00 RPM or less making slow speed maneuvers, e.g., slow speed turning maneuvers of 20.0 mph or less, difficult to learn and perform. As such, the present disclosure is directed to motorcycle maximum lean angle development including, but not necessarily limited to developing the ability to make slow speed low RPM motorcycle 100 maneuvers by developing the ability to identify a maximum lean angle just prior to losing the gyroscopic effect of a motorcycle 100. The present disclosure is also directed to a maximum lean angle indication device releasably or permanently securable to a motorcycle in one or more locations along a motorcycle 100 suitable for maximum lean angle development.

Figure 2:
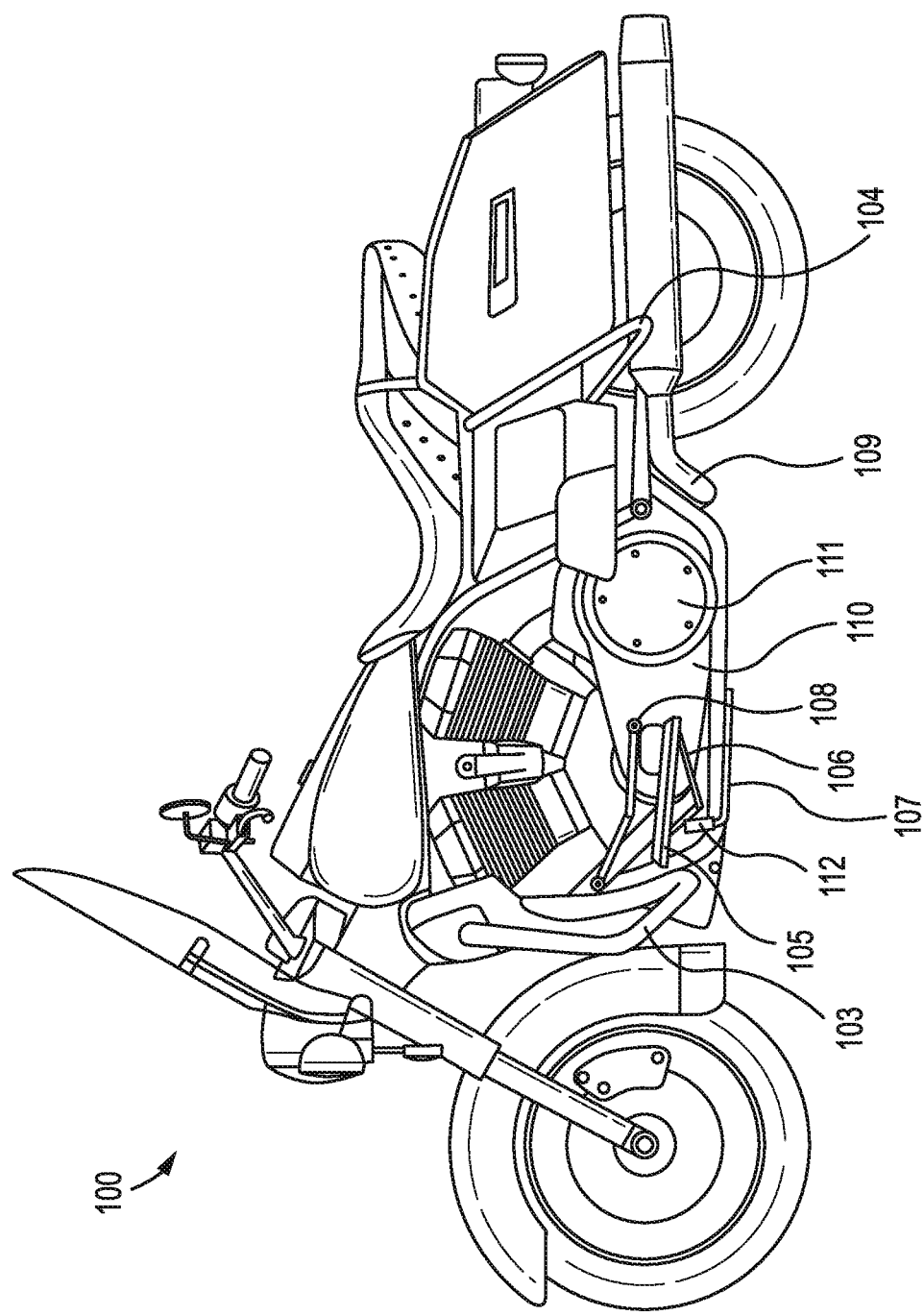
FIG. 2 is a left side view of a non-limiting example of a motorcycle of the present disclosure.
Figure 3:
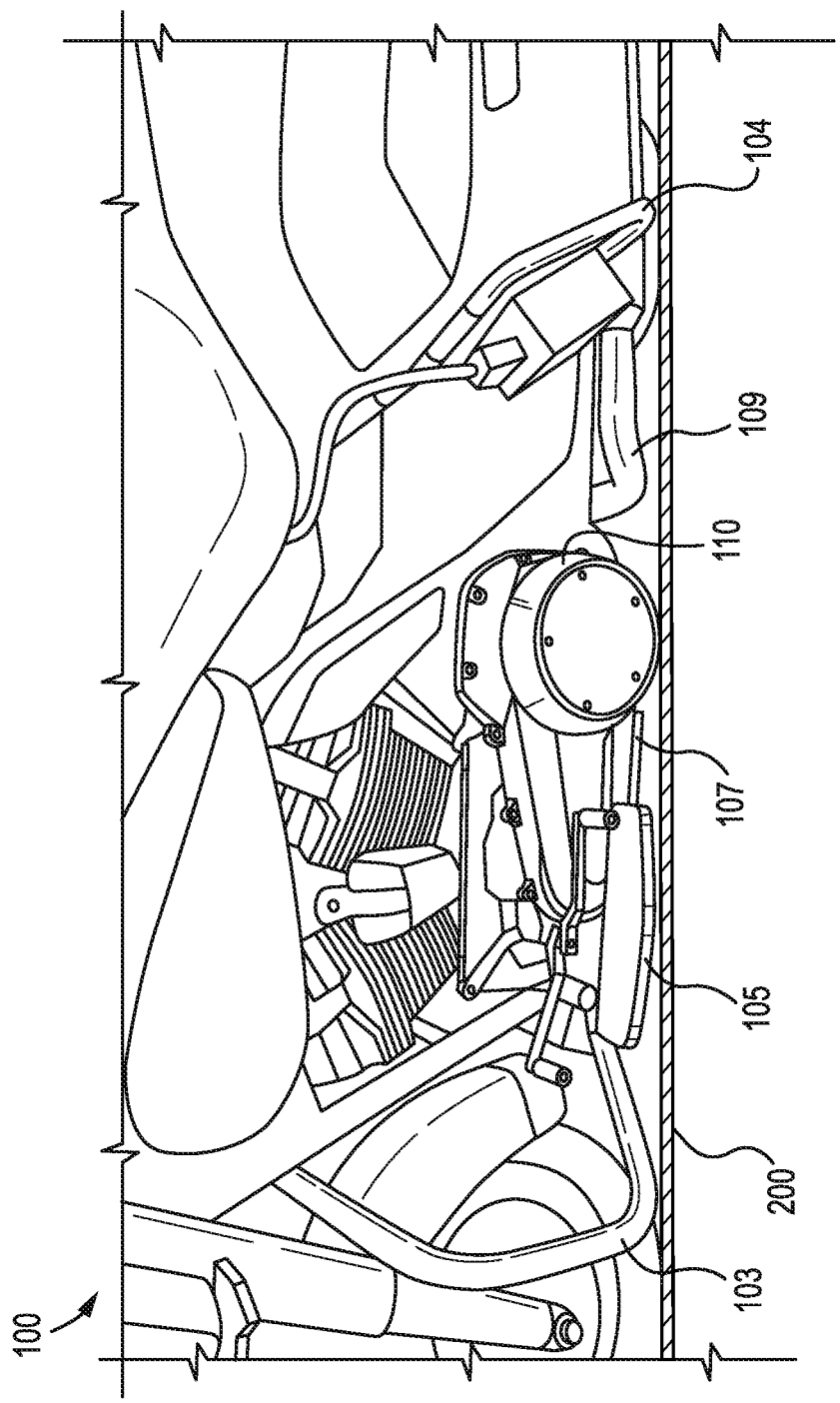
FIG. 3 is a left side view of part of a non-limiting example of a motorcycle of the present disclosure in a left leaning orientation including components of the motorcycle contacting an operating surface of the motorcycle.

With reference to FIGS. 1-3, as understood by the skilled artisan a maximum lean angle for most motorcycles falls within a range of 25.0 to 50.0 degrees depending on the type of motorcycle and the size and/or shape and/or location of one or more components or parts of a particular type of motorcycle. One non-limiting embodiment of a motorcycle 100 of this disclosure is shown in FIG. 2, which depicts various components located along or near the lowermost part of a left side of the motorcycle 100 susceptible to contact damage once a motorcycle 100 realizes a contact lean angle against an operating surface 200. Exemplary components located on a left side of a motorcycle 100 that are susceptible to contact damage include, but are not necessarily limited to an engine guard 103, a saddlebag guard 104, a footboard 105 (or "floorboard"), a footboard bracket 106, a kickstand 107, a toe shift lever 108, one or more heat shields 109, an outer primary cover 110, a derby cover 111, and combinations thereof. As understood by the skilled artisan, the right side of a motorcycle 100 also includes an engine guard, a saddlebag guard, a footboard, a footboard bracket, one or more heat shields, and combinations thereof, susceptible to contact damage. In addition, and depending on the motorcycle 100, a lower part of a motorcycle 100 frame 70 may also be susceptible to contact damage on either side of a motorcycle 100 (see FIG. 45).

Figure 4:
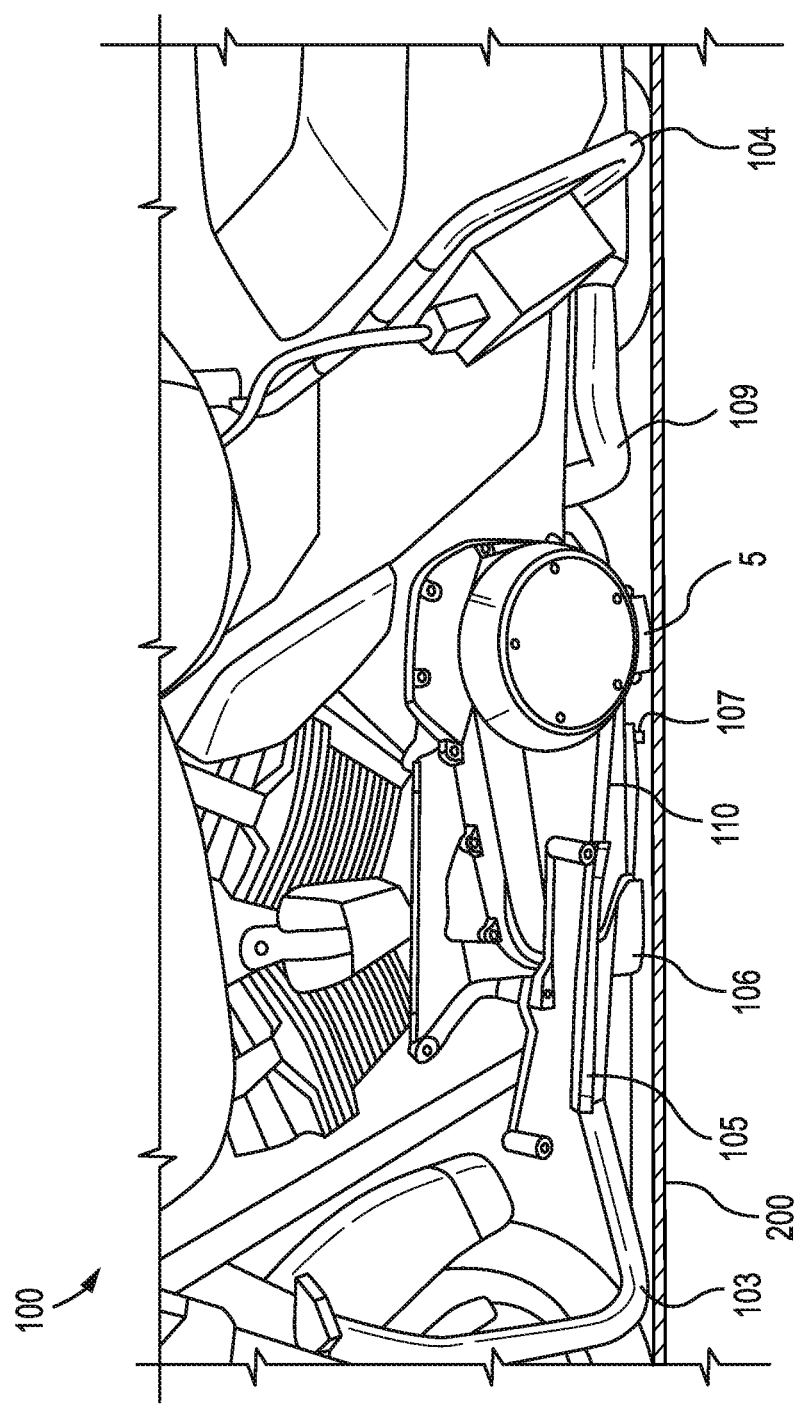
FIG. 4 is a left side view of part of a non-limiting example of a motorcycle of the present disclosure in a left leaning orientation, the motorcycle including a lean angle indication device attached thereto in a manner effective to indicate a maximum lean angle of the motorcycle and to separate the components of the motorcycle apart from an operating surface of the motorcycle.

As shown in FIG. 3, when a motorcycle 100 realizes a contact lean angle against an operating surface 200 one or more of the above described components may contact an operating surface 200, which may damage one or more of the components. With reference to FIG. 4, the present disclosure provides a lean angle indication device 5 or lean indicator 5 (hereafter "device 5") attachable to one or more of the above described components that may be operationally configured as a lean angle indication device including as a maximum lean angle indication device and as a deflective device to prevent a motorcycle 100 from realizing a contact lean angle. As such, a device 5 of this disclosure may also be referred to herein as a "lean angle indication and deflective device."

As mentioned previously, a device 5 of this disclosure is operationally configured to assist motorcyclists 3 in identifying and operating at or near a target lean angle including, but not necessarily limited to a maximum lean angle of a particular motorcycle 100. Although a maximum lean angle of a particular motorcycle 100 is technically a lean angle whereby one or more of the above components, or other components, may be located as near as possible to an operating surface 200 without actually touching the operating surface 200, and because operating surfaces 200 such as vehicular streets may be non-uniform in surface appearance, e.g., not consistently planar, flat or smooth, and may include debris thereon, i.e., a non-uniform operating surface 200, a maximum lean angle of a particular motorcycle 100 as discussed herein may include an operable maximum lean angle according to the size and/or shape and location of a device 5 along a motorcycle 100 wherein an operable maximum lean angle may include a range of lean angles from (1) a first lean angle of a motorcycle 100 from an upright vertical position less than a contact lean angle to (2) a second lean angle less than the first lean angle. For example, a motorcycle 100 as shown in FIG. 2 may include a contact lean angle on a left side of or about thirty-one degrees (31.0) and a contact lean angle on a right side of or about thirty-two (32.0) degrees. As such, a device 5 of this disclosure may provide an operable maximum lean angle on a left side of the motorcycle 100 including a first left side lean angle of or about 30.0 degrees to a second left side lean angle of or about 28.0 degrees and an operable maximum lean limit on a right side of the motorcycle 100 including a first right side lean angle of or about 31.0 degrees to a second right side lean angle of or about 29.0 degrees. For a motorcycle 100 as shown in FIG. 2, at the above range one or more of the above described components may be set apart from an operating surface 200 a distance of or about 0.64 cm (0.25 inches) at a first lean angle and at a distance of or about 2.54 cm (1.0 inches) apart from an operating surface 200 at a second lean angle in either lean direction.

Figure 5:
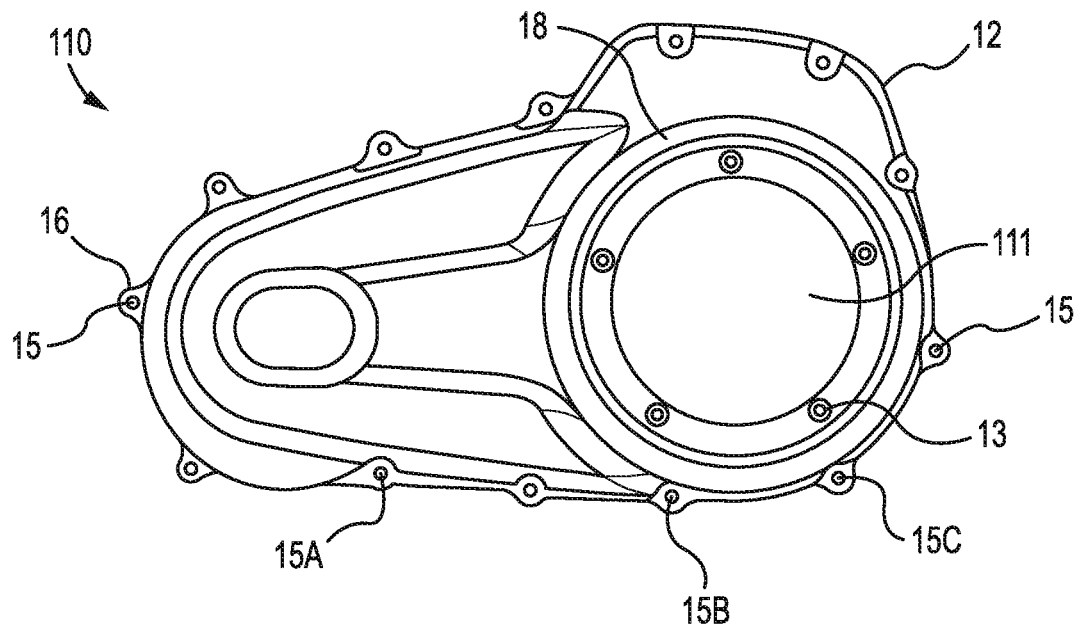
FIG. 5 depicts an embodiment of an exemplary outer primary cover of a motorcycle.
Figure 6:
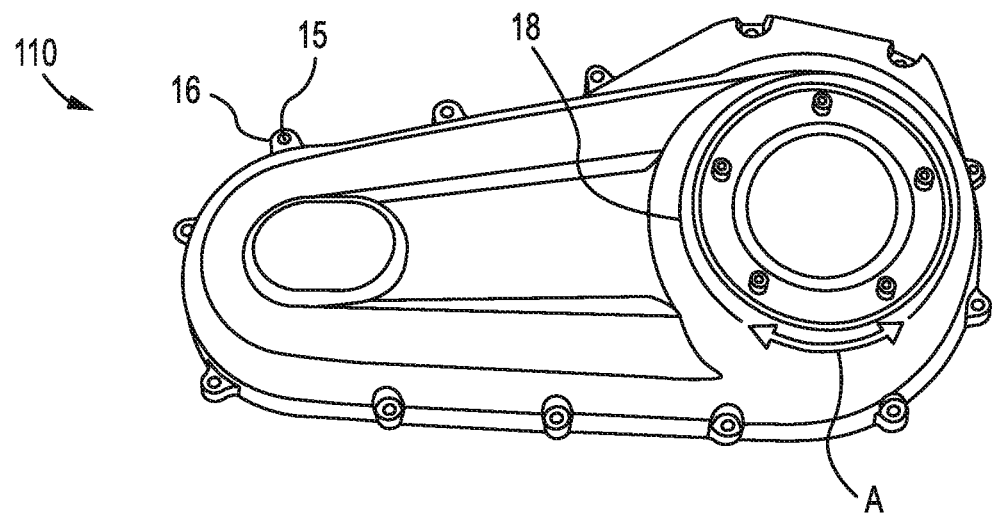
FIG. 6 depicts another embodiment of an exemplary outer primary cover.
Figure 7:
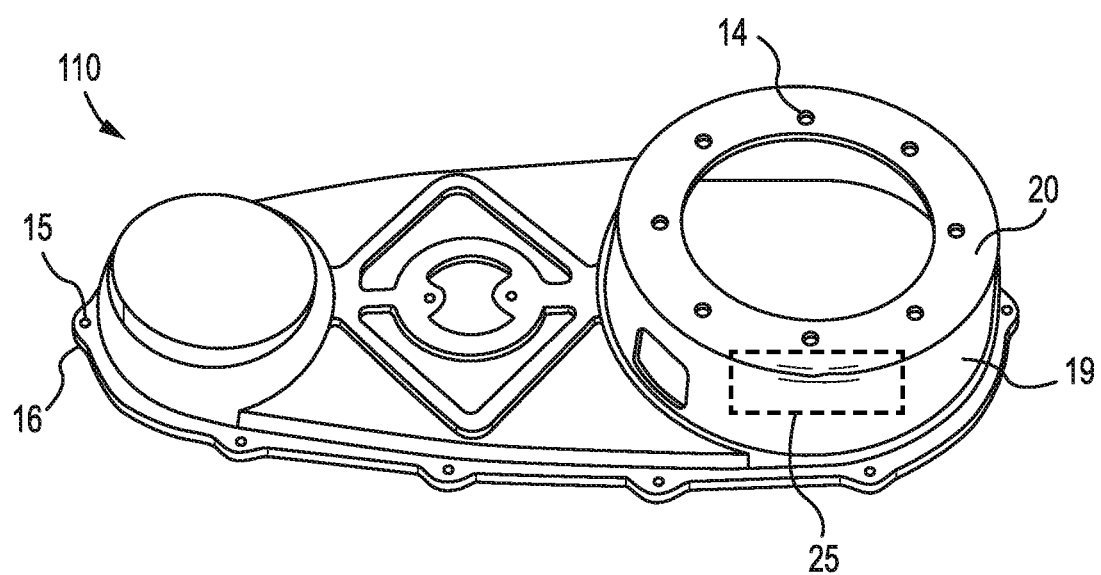
FIG. 7 depicts another embodiment of an exemplary outer primary cover.

As shown in FIG. 4, in one embodiment a device 5 may be releasably attached to an outer primary cover 110 as an outer primary cover 110 is often the first component to contact an operating surface 200 when a contact lean angle of a motorcycle 100 is realized. Non-limiting examples of outer primary covers 110 are depicted in FIGS. 5-7. As shown, an outer primary cover 110 typically includes a raised circular type portion 18 defined by an outer sidewall 19 and a top portion 20 including a removable derby cover 111 releasably attached thereto, the outer primary cover 110 (hereafter "primary cover 110") being operationally configured to cover a clutch of the motorcycle 100. Like the primary cover 110, the size and shape of a corresponding derby cover 111 may vary according to the make and model of motorcycle 100.

Because of the configuration of the raised circular portion 18 in relation to the remainder of the primary cover 110, when a motorcycle 100 realizes a contact lean angle, at least a portion of the raised circular portion 18 may be the first part of a motorcycle 100 to contact an operating surface 200 (see contact area 25 in FIG. 7). Depending on the one or more forces applied to the raised circular portion 18 by an operating surface 200, the contact area 25 and/or other portions of the primary cover 110 may be physically damaged, e.g., scratching, grinding, crushing, denting, and combinations thereof, necessitating replacement of the primary cover 110 for aesthetic purposes and/or for suitable operation of the motorcycle 100.

Figure 8:
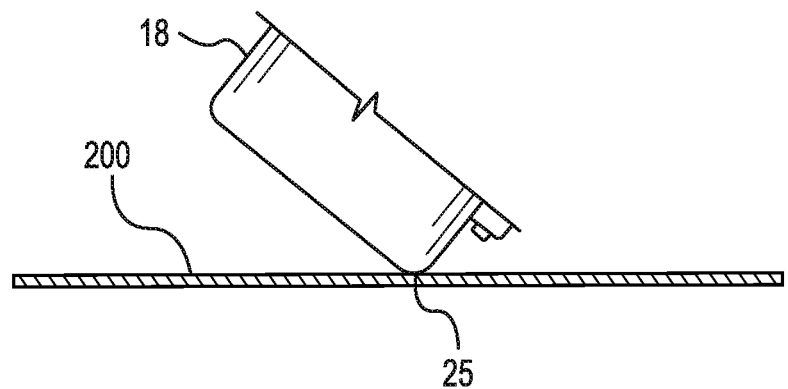
FIG. 8 is a side view of part of an outer primary cover in contact with an operating surface of a motorcycle.
Figure 9:
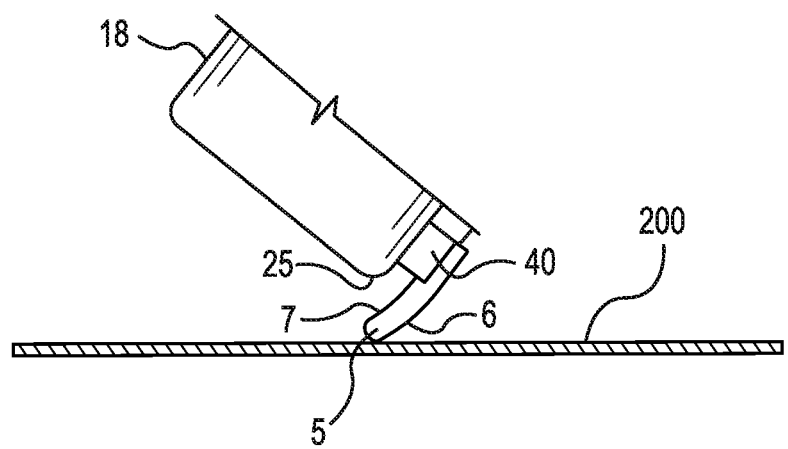
FIG. 9 is a side view of the outer primary cover of FIG. 8 including a lean angle indication device attached thereto in a manner effective to separate the outer primary cover from the operating surface of a motorcycle when the lean angle indication device contacts the operating surface.

As shown in FIG. 8, one common contact area 25 is located along the lower most portion of the raised circular portion 18 of the primary cover 110 during operation of a motorcycle 100. As shown in FIG. 9, a device 5 may be located at or near a contact area 25 of the primary cover 110 wherein part of the device 5 is separated from the primary cover 110 a distance effective to signal or indicate to a motorcyclist 3 that he/she has reached a target lean angle, e.g., an operable maximum lean angle for his/her motorcycle 100, without realizing a contact lean angle of the motorcycle 100. As understood by the skilled artisan, if the outer surface 6 of the device 5 is located too near to a contact area 25 of a primary cover 110, contact of the outer surface 6 against an operating surface 200 operationally equates to realizing a contact lean angle of the motorcycle 100.

As FIG. 9 illustrates, in instances where the outer surface 6 of the device 5 contacts an operating surface 200, the gap or spacing between the device 5 and the contact area 25 of the primary cover 110 provides for deflection of the device 5 effective to prevent an inner surface 7 of the device 5 from contacting the primary cover 110 and/or damaging the primary cover 110 when one or more forces are applied to the outer surface 6 of the device 5, thereby preventing structural damage to the primary cover 110. For purposes of this disclosure, the space between the inner surface 7 of the device 5 and the primary cover 110 may be referred to as a "deflection gap" or "deflection space"—see Arrow B in FIG. 11. Although the distance defining the deflection gap is not necessarily limited and may vary according to the make and/or model of motorcycle 100 using the device 5, for use in connection with a motorcycle 100 as shown in FIG. 2, an inner surface 7 of the device 5 may be set apart from a raised circular portion 18 of a primary cover 110 at a distance of or about 0.16 cm (0.0625 inches) to or about 5.08 (2.0 inches).

Figure 10:
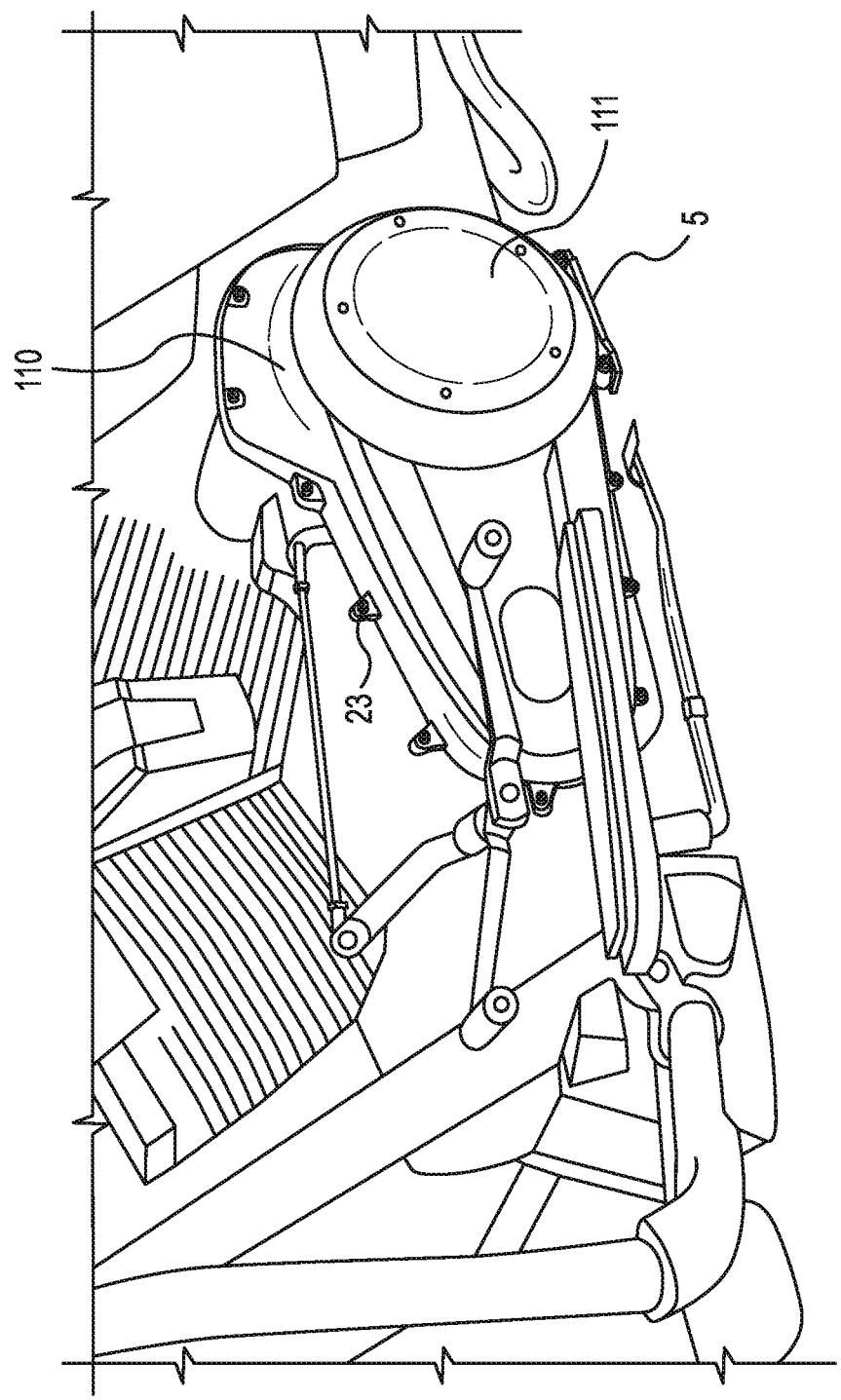
FIG. 10 depicts an embodiment of a lean angle indication device attached to an outer primary cover of a motorcycle.
Figure 11:
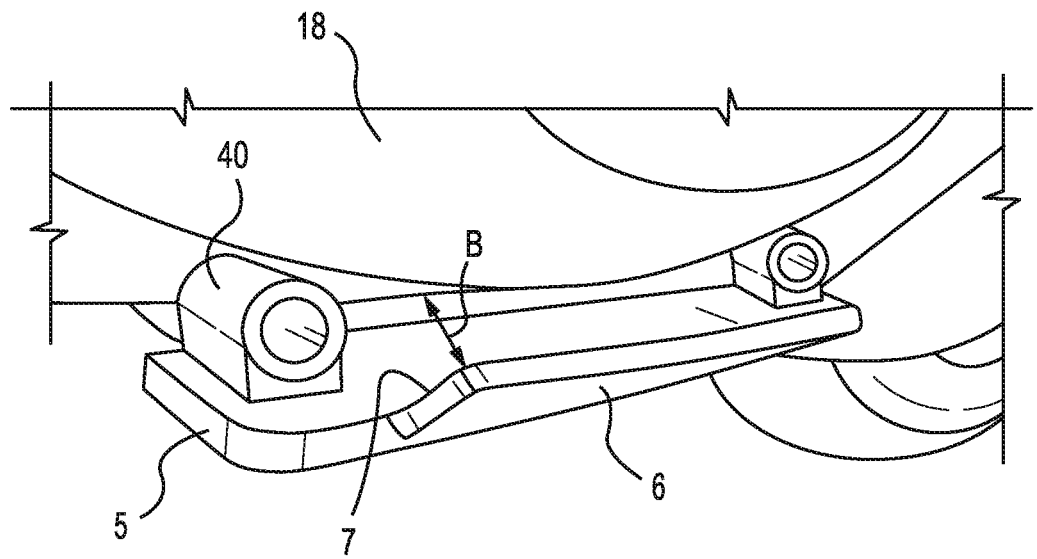
FIG. 11 is a perspective view of the lean angle indication device of FIG. 10 attached to an outer primary cover of a motorcycle.
Figure 12:
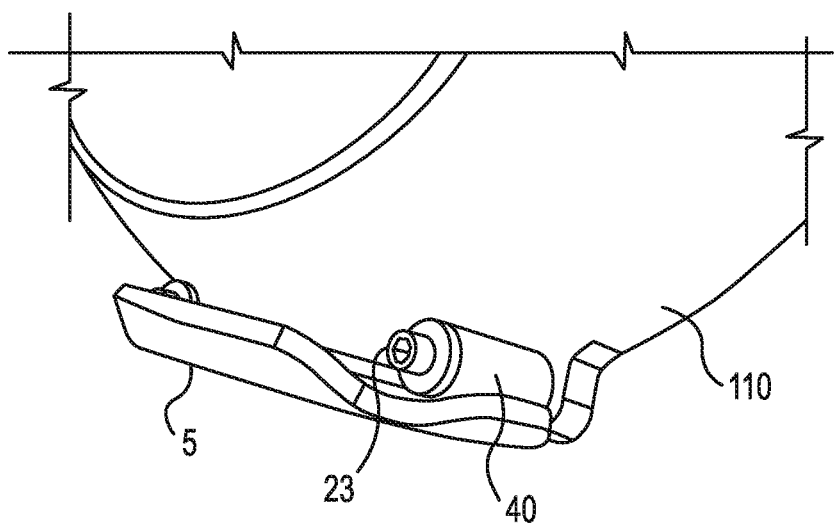
FIG. 12 is a perspective view of an embodiment of a lean angle indication device attached to an outer primary cover of a motorcycle.

As shown in FIGS. 10-12, in one embodiment the device 5 may be releasably attached to a motorcycle 100 via one or more fasteners 23 via and one or more corresponding fastener holes of a primary cover 110. With reference to FIGS. 5-7, a primary cover 110 may include an outer perimeter 12 with a plurality of fastener holes 15 corresponding to fastener holes of an inner primary cover (not shown) of a motorcycle 100. Although the location, size and number of fastener holes 15 may vary, one exemplary primary cover 110 may have a total of thirteen fastener holes 15 disposed along the perimeter 12 for optimum attachment of the primary cover 110 to an inner primary cover (not shown) of a motorcycle 100. As shown, a primary cover 110 may include one or more projections 16 extending out from the perimeter 12, each projection 16 having a fastener hole 15 there through. A primary cover 110 may also include one or more fastener holes 15 located within the body of the primary cover 110 (see fastener hole 15A in FIG. 5). Accordingly, one embodiment of a device 5 may be operationally configured to cover an identified contact area 25 or a portion thereof by securing the device 5 to one or more fastener holes of a primary cover 110 located below the raised circular portion 18, e.g., see fastener holes 15B and 15C in FIG. 5.

In another embodiment, a device 5 may be releasably attachable to a derby cover 111 of a primary cover 110 in a manner effective as a lean angle indication and deflective device of a motorcycle 100. With further reference to FIGS. 5-7, a derby cover 111 may include a plurality of fastener holes corresponding to fastener holes 14 for receiving fasteners 13 there through effective for fastening the derby cover 111 to a primary cover 110. The total number of fastener holes 14 may vary amongst different primary covers 110. Common outer primary covers 110 include five to eight fastener holes 14 for releasable attachment of a derby cover 111 to a primary cover 110. As such, in another embodiment, a device 5 may be releasably attached to a primary cover 110 via one or more fastener holes 14. In still another embodiment, a device 5 may be permanently attached to a primary cover 110, e.g., via welds, via one or more adhesives, and combinations thereof.

Turning to FIGS. 13-19, in one embodiment a device 5 may include (1) a main body 35 operationally configured as a deflection member of the device 5 and (2) opposing fastener members or fastener reinforcement members 40 disposed at or near opposing sides of the main body 35, each fastener reinforcement member 40 including an opening 41 defined by a central axis 33 that is operationally configured to receive a fastener 23 there through, e.g., a threaded fastener such as a bolt, screw or the like, in a manner effective to releasably attach the device 5 to a motorcycle 100. As shown, each of the fastener reinforcement members 40 may include an elongated body operationally configured to house at least part of a corresponding fastener 23 therein in a manner effective to structurally reinforce each fastener 23 against shearing forces during operation of the device 5. In one embodiment, a shank and head of each of the one or more fasteners 23 may be disposed within the fastener reinforcement members 40 (see FIG. 11). In another embodiment, at least a shank of the one or more fasteners 23 may be disposed within the fastener reinforcement members 40 with a head of each of the one or more fasteners 23 being located out from the fastener reinforcement members 40 (see FIG. 12). In still another embodiment, part of a threaded surface of a fastener 23, in addition to a shank of a fastener may be disposed within a fastener reinforcement member 40.

Figure 13:
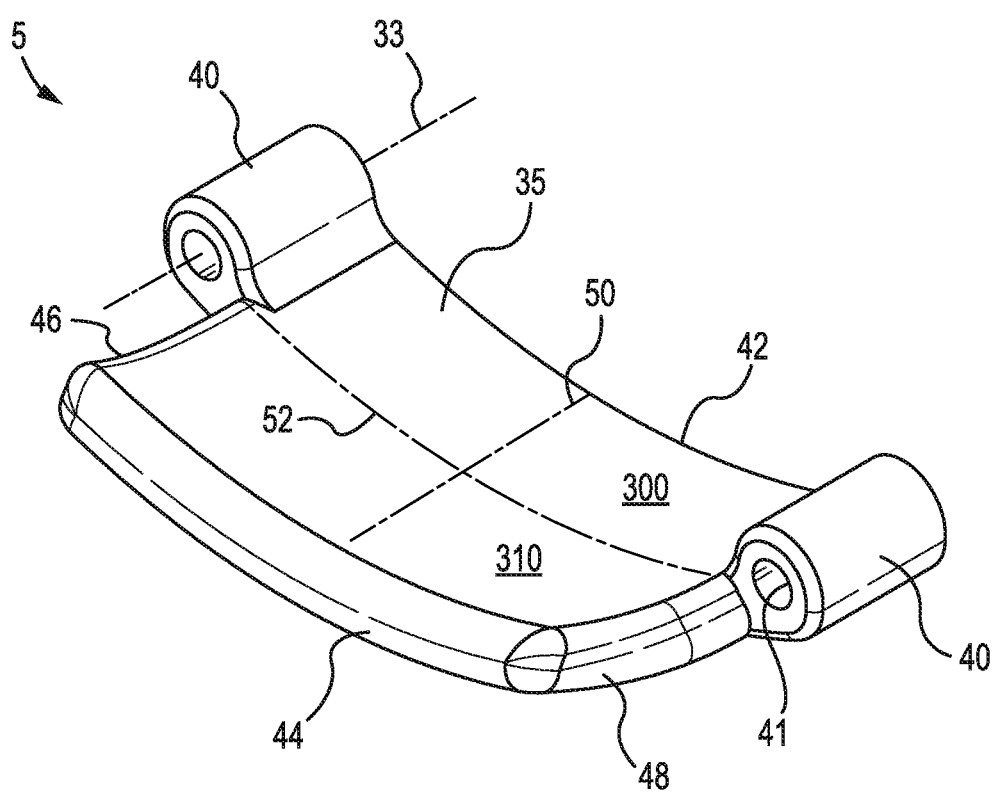
FIG. 13 is a perspective view of an embodiment of a lean angle indication device of the present disclosure.
Figure 14:
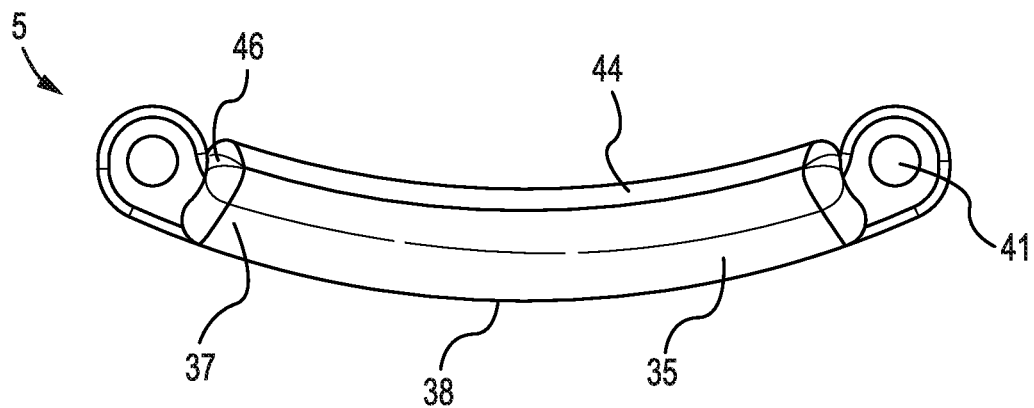
FIG. 14 is a front view of the lean angle indication device of FIG. 13.
Figure 15:
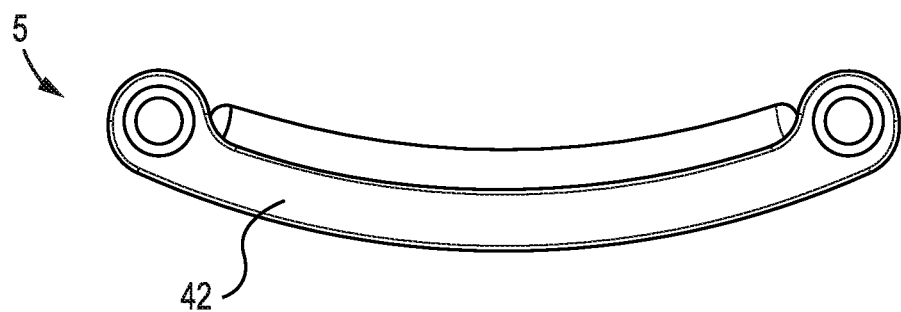
FIG. 15 is a rear view of the lean angle indication device of FIG. 13.
Figure 16:
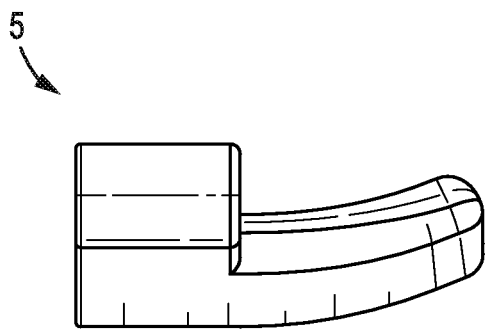
FIG. 16 is a right side view of the lean angle indication device of FIG. 13.
Figure 19:
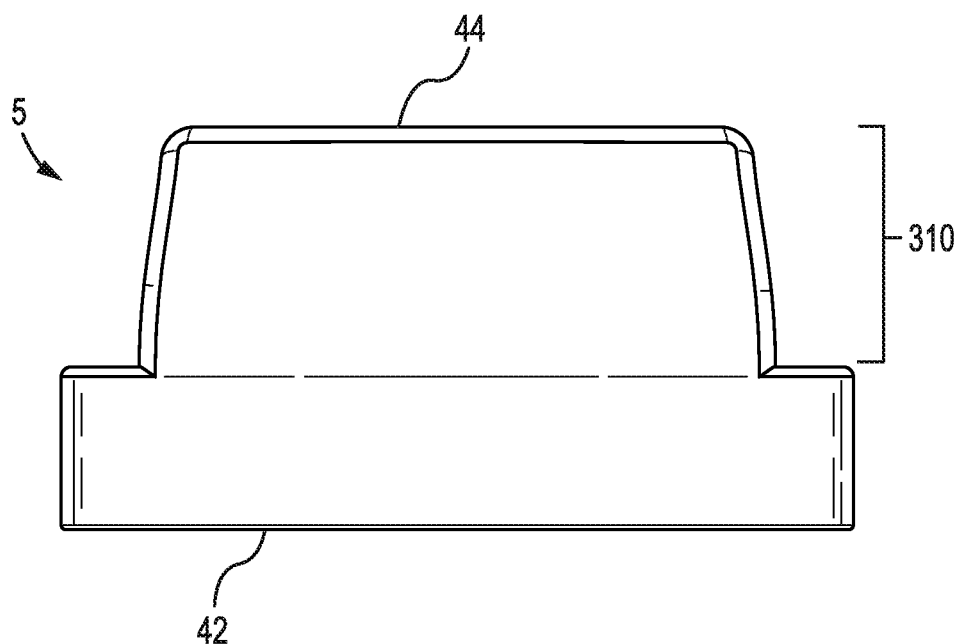
FIG. 19 is a bottom view of the lean angle indication device of FIG. 13.
Figure 20:
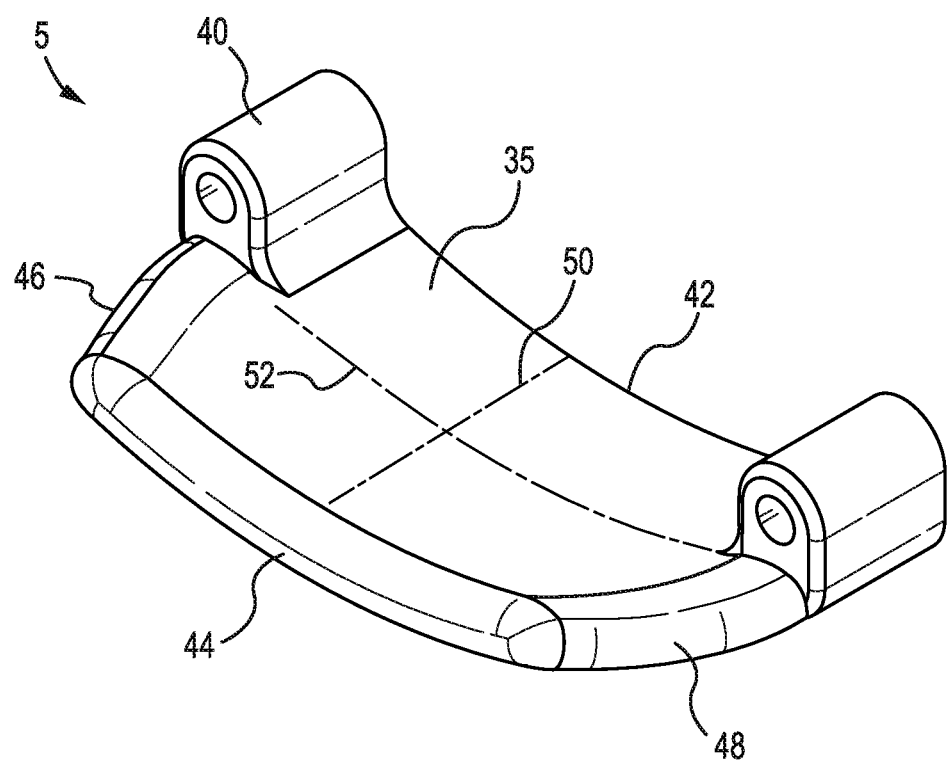
FIG. 20 is a perspective view of another embodiment of a lean angle indication device of this disclosure.
Figure 21:
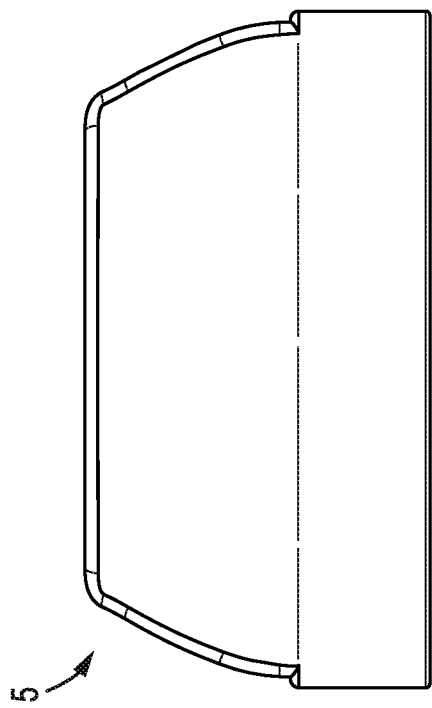
FIG. 21 is a top view of the lean angle indication device of FIG. 20.

In the embodiment of FIGS. 13-19 the main body 35 has a rear surface 42 that terminates in a straight edge and a front surface 44 that terminates in a straight edge in parallel alignment with the straight edge of the rear surface 42 (see FIG. 19). In another embodiment the rear surface 42 and the front surface 44 may be provided in a non-parallel alignment. As shown in FIGS. 14 and 15, left to right the rear surface 42 and the front surface 44 may be provided in a curved configuration according to the shape of the main body 35. The main body 35 also has a non-linear first side surface 46 and a non-linear second side surface 48 as shown. In another embodiment, the first and second side surfaces 46 and 48 may be provided as straight edge surfaces in parallel alignment or in non-parallel alignment.

In the embodiment of FIGS. 13-19 the fastener reinforcement members 40 are provided as tubular type members defined by an outer diameter and an inner diameter. In another embodiment, the fastener reinforcement members 40 may include a different outer surface configuration, a multi-sided configuration, oval configuration, defined by an outer width and an inner diameter. Without limiting the length of the fastener reinforcement members 40, one suitable reinforcement member 40 may include an opening 41 having a length at least 50.0 percent the length of a corresponding fastener 23 disposed there through. In addition, the length of the fastener reinforcement members 40 may be from or about twenty (20.0) percent to or about fifty (50.0) percent the length of the main body 35 from the rear surface 42 to the front surface 44. In the embodiment of FIGS. 13-19 the length of each fastener reinforcement member 40 is about forty (40.0) percent the length of the main body 35 from the rear surface 42 to the front surface 44.

In the embodiment of FIGS. 13-19, the fastener reinforcement members 40 are spaced apart in a manner effective to be concentrically aligned with target fastener holes 15 of a primary cover 110, e.g., fastener holes 15B and 15C in FIG. 5, whereby threaded fasteners 23 such as bolts, screws or the like may be directed through each of the openings 41 and corresponding fastener holes 15 of the primary cover 110 for releasably attaching the device 5 to the primary cover 110 at or near the lower most portion of the raised circular portion 18, e.g., at or near the contact area 25 (see FIG. 10). Herein, fastener holes such as fastener holes 15B and 15C in FIG. 5 may be referred to as the "bottom fastener holes" of a primary cover 110. As understood by the skilled artisan, the central axis 33 of each opening 41 may be aligned as required in relation to the main body 35 to concentrically align with a particular target fastener hole 15. As such, the central axis 33 of the fastener reinforcement members 40 may be in a parallel alignment in one embodiment of the device 5 and in a non-parallel alignment in another embodiment of the device 5 according to the orientation of the target fastener holes 15—or other target fastener holes of a motorcycle 100.

Common fasteners 23 used with primary covers 110 and which may be used with the device 5, include, but are not necessarily limited to Allen head bolts. One exemplary fastener 23 may include, but is not necessarily limited to a 5.0 mm (³⁄₁₆ inch) Allen head bolt at a length ranging from 50.8 mm (2.0 inches) to 63.5 mm (2.5 inches). As shown in FIG. 9, the fastener reinforcement members 40 of the device 5 are operationally configured to space the main body 35 apart from the primary cover 110 when the fastener reinforcement members 40 are attached to a motorcycle 100, e.g., when the fastener reinforcement members 40 are attached to a primary cover 110.

As shown in FIG. 13, the main body 35 may be curved lengthwise about a center line 50 of the main body 35 from the rear surface 42 to the front surface 44 providing a curvature including, but not necessarily limited to a curvature that may be the same or substantially similar as the curvature of a corresponding outer sidewall 19 of the raised circular portion 18 (see Arrow A in FIG. 6) of a primary cover 110 whereby the main body 35 may contour the surface of the outer sidewall 19 during use of the device 5 (see FIG. 4). As shown in FIG. 13, in this embodiment the center line 50 of the main body 35 is in parallel alignment with the central axis 33 of the openings 41 of the fastener reinforcement members 40.

The main body 35 may also be curved about a bend line 52 of the main body 35 in a manner effective for the front surface 44 to extend at least partly toward a derby cover 111 of a raised circular portion 18 when the device 5 is attached to a primary member 110. With reference to FIG. 14, a curved main body 35 provides a raised contact surface area 37 portion at or near the first side surface 46 in relation to the contact surface area 38 at an apex of the main body 35. In operation, such configuration of the main body 35 is suitably effective to diminish or otherwise prevent the first side surface 46 from catching or digging directly into an operating surface 200 upon contact—the curvature of the main body 35 providing or improving slidability to the outer surface 6 of the device 5 as the device 5 contacts an operating surface 200 when the corresponding motorcycle 100 is in forward motion. In another embodiment, the main body 35 may be provided as a flat type planar member as may be desired for one or more particular uses of the device 5. However, the orientation of a curved main body 35 in relation to a raised circular portion 18 may be effective to increase the lean angle of a motorcycle 100 compared to a flat type main body 35 applied to the same motorcycle 100, i.e., a flat type main body 35 may contact an operating surface 200 sooner than a curved main body 35 as the curvature of a curved main body 35 may provide added clearance from an operating surface 200 when a motorcycle 100 is maneuvering through slow and/or tight turns including U-turns.

Figure 17:
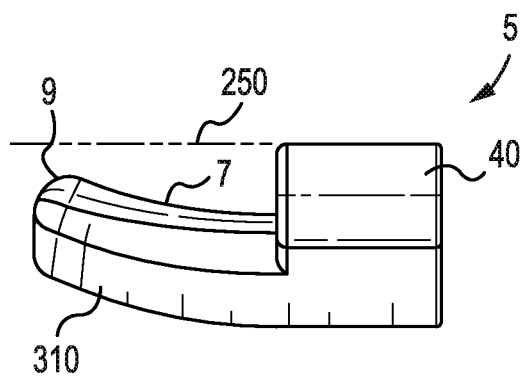
FIG. 17 is a left side view of the lean angle indication device of FIG. 13.
Figure 18:
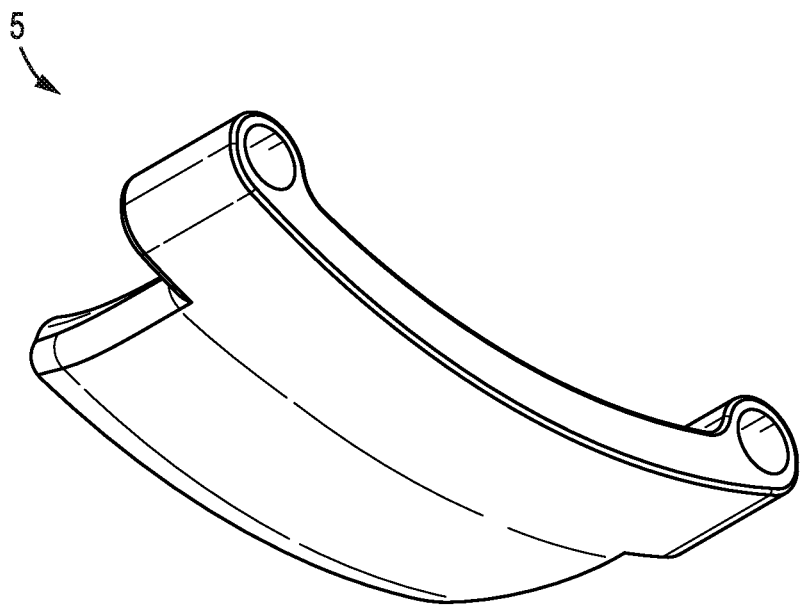
FIG. 18 is a bottom perspective view of the lean angle indication device of FIG. 13.
Figure 23:
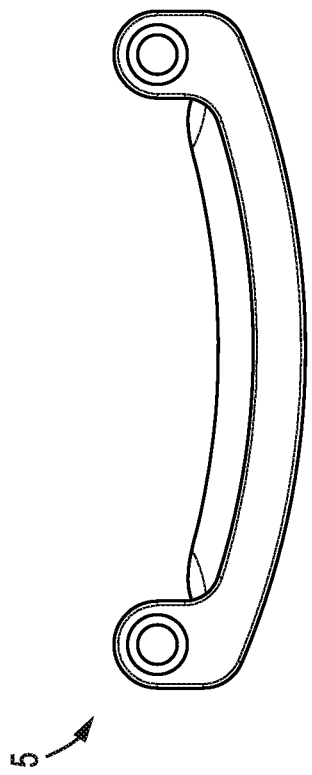
FIG. 23 is a front view of the lean angle indication device of FIG. 20.
Figure 22:
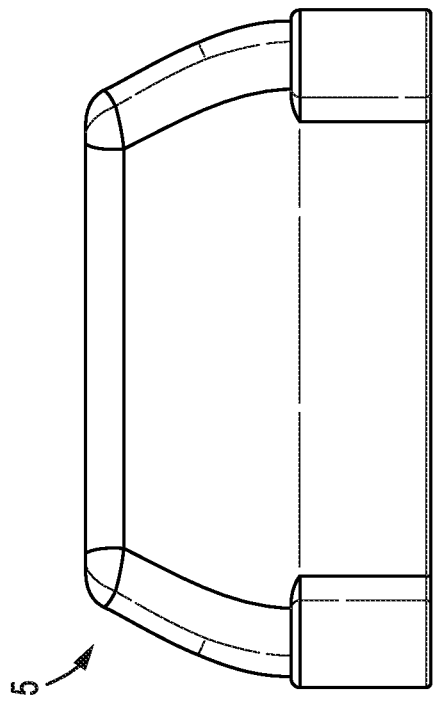
FIG. 22 is a bottom view of the lean angle indication device of FIG. 20.
Figure 24:
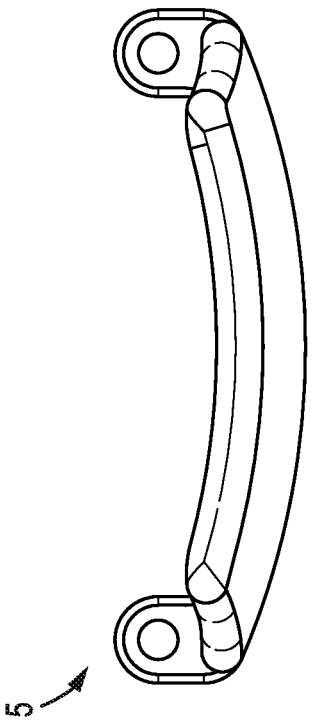
FIG. 24 is a rear view of the lean angle indication device of FIG. 20.
Figure 28:
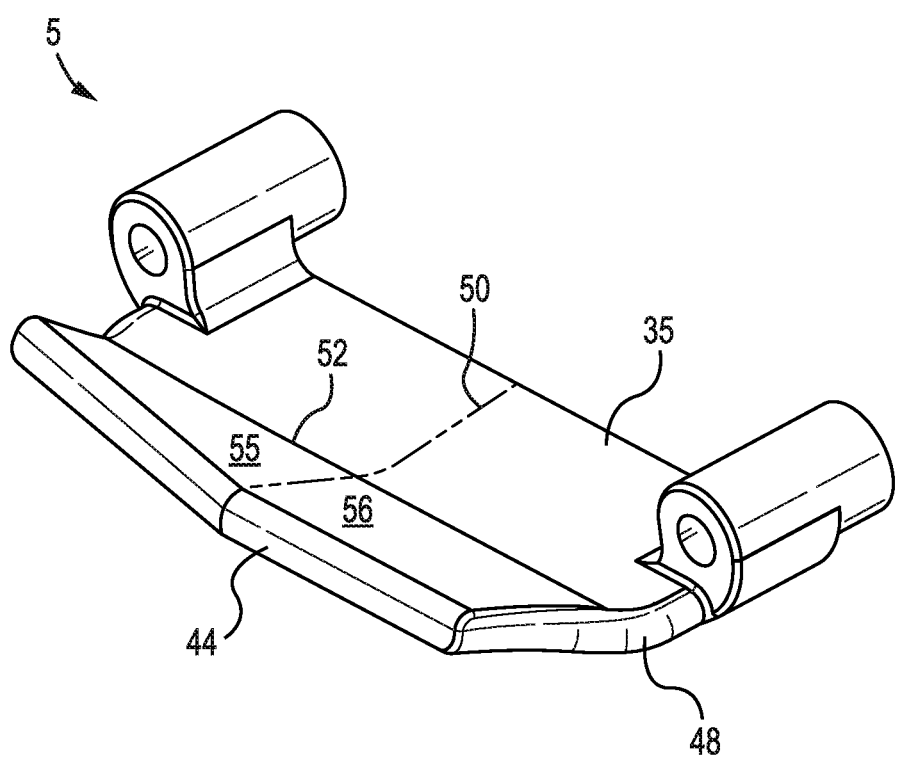
FIG. 28 is a perspective view of another embodiment of a lean angle indication device of this disclosure.
Figure 29:
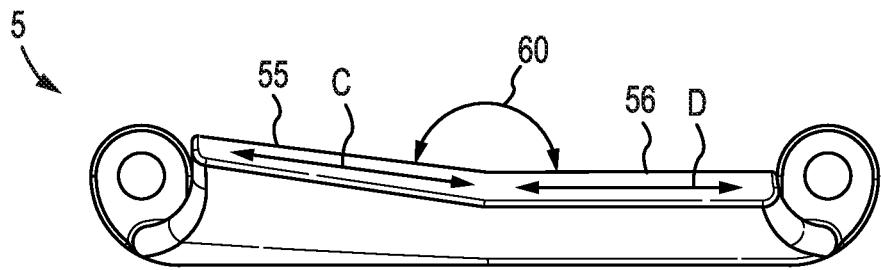
FIG. 29 is a front view of the lean angle indication device of FIG. 28.
Figure 30:
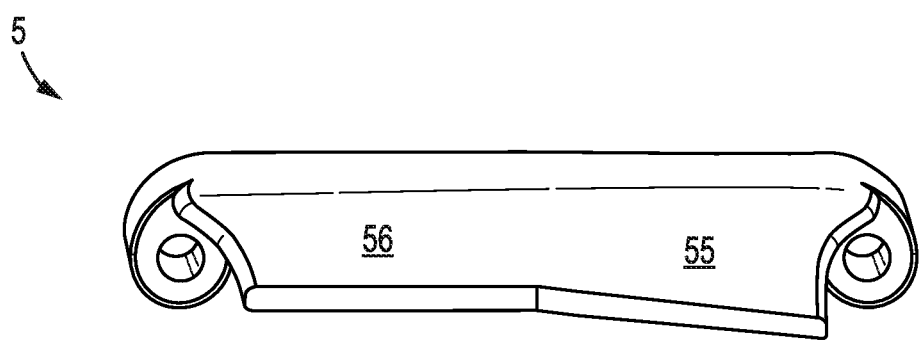
FIG. 30 is a bottom perspective view of the lean angle indication device of FIG. 28.
Figure 31:
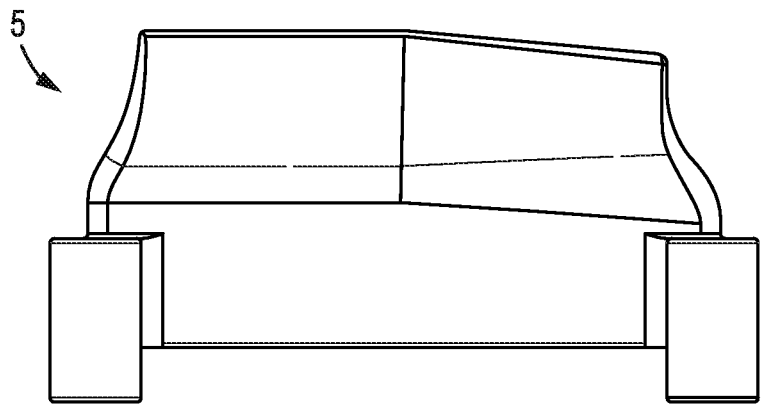
FIG. 31 is a top view of the lean angle indication device of FIG. 28.
Figure 32:
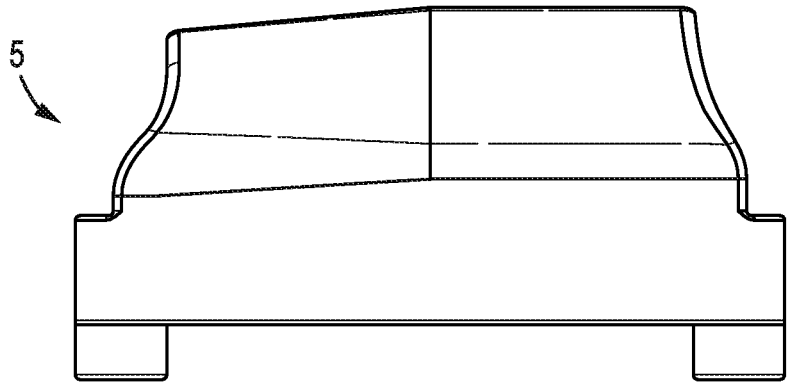
FIG. 32 is a bottom view of the lean angle indication device of FIG. 28.
Figure 33:
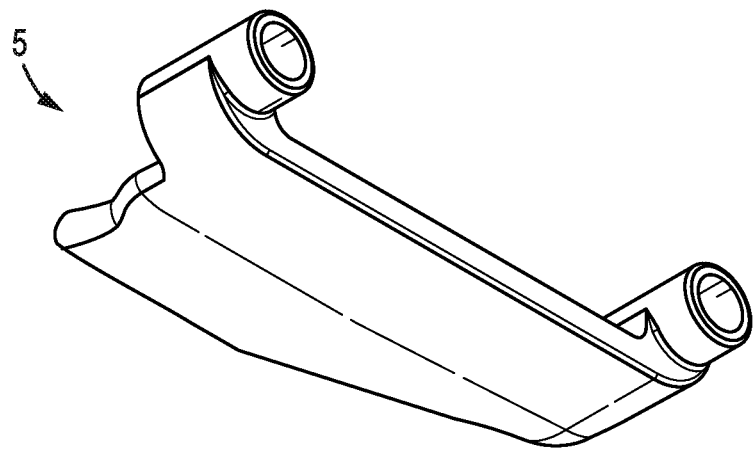
FIG. 33 is a bottom perspective view of the lean angle indication device of FIG. 28.
Figure 34:
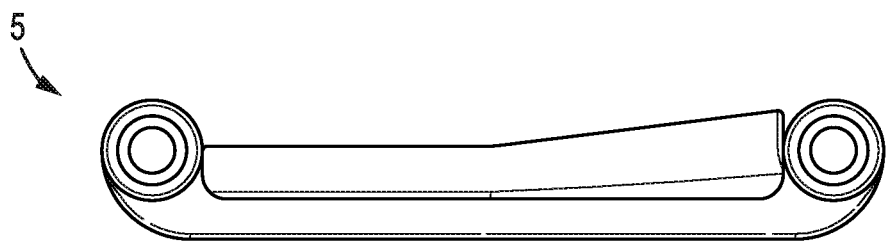
FIG. 34 is a rear view of the lean angle indication device of FIG. 28.
Figure 35:
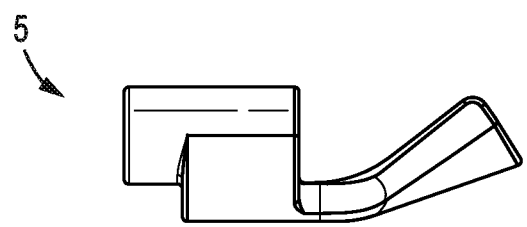
FIG. 35 is a right side view of the lean angle indication device of FIG. 28.
Figure 36:
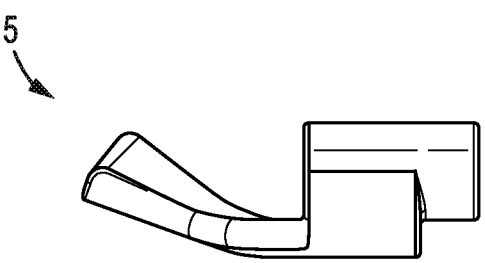
FIG. 36 is a left side view of the lean angle indication device of FIG. 28.

With reference to FIGS. 13 and 19, the main body 35 suitably includes at least two sections: (1) a base body section 300 disposed between the fastener reinforcement members 40 and (2) a deflective body section 310 extending out from the base body section 300. As shown in FIG. 13, the bend line 52 may define a division between the base section 300 and the deflective section 310. Referring to FIG. 17, when the device 5 is secured to a motorcycle 100 the distal end 9 of the inner surface 7 of the deflective body section 310 terminates at or below an uppermost surface of the fastener reinforcement members 40 (see line 250). In another embodiment, the distal end 9 of the inner surface 7 of the deflective body section 310 may terminate below the openings 41 of the fastener reinforcement members 40, e.g., see FIG. 23. As such, when the device 5 is attached to a surface of a motorcycle 100, e.g., attached to a primary cover 110, the deflective body section 310 suitably extends out from the base body section 300 a distance greater than the distance the deflective body section 310 extends up from the base body section 300—such may be referred to herein as "outward extension" or "lateral extension" of the deflective body section 310. Outward extension of the deflective body section 310 is effective to provide a deflection gap between the deflective body section 310 and a surface of a motorcycle 100, e.g., a surface of a primary cover 110, thereby preventing any contact forces acting on the outer surface 6 of the deflective body section 310 to be transferred to a surface of the motorcycle 100, e.g., a surface of a primary cover 110.

In another embodiment of the device 5 as shown in FIGS. 20-27, the first side surface 46 and a second side surface 48 of the device 5 may be angled or otherwise taper inward toward the center line 50 reducing the length of the front surface 44. In another embodiment of the device as shown in FIGS. 28-36, the device 5 may include a narrowed non-linear front surface 44 as shown. In particular, the portion of the main body 35 located from the bend line 52 to the front surface 44 may be comprised of two planar sections (first section 55, second section 56) offset from one another providing a raised first side surface 46 and a front surface 44 defined by an angle 60 of or about 165.0 degrees—see Arrow C and Arrow D in FIG. 29. In another embodiment, a front surface 44 may be defined by an angle 60 greater than 165.0 degrees or less than 165.0 degrees. Similar as discussed above, a raised first side surface 46 of this embodiment is operationally configured to diminish or otherwise prevent the first side surface 46 from catching or digging directly into an operating surface 200 upon contact whereby the configuration of the first and second sections 55, 56 are operationally configured to provide or improve slidability of the device 5 as the device 5 contacts an operating surface 200 when the corresponding motorcycle 100 is in forward motion.

Figure 37:
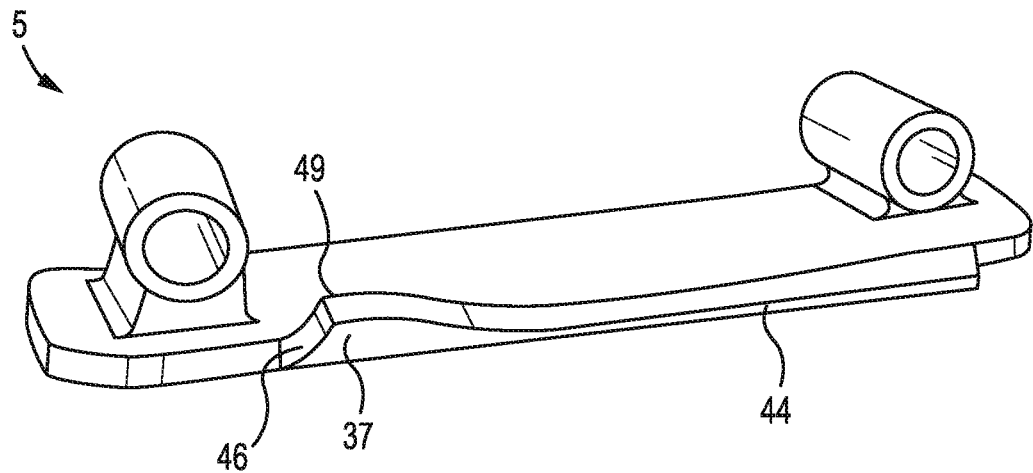
FIG. 37 is a perspective view of another embodiment of a lean angle indication device of this disclosure.

As shown in FIG. 37, in another embodiment of the device 5 a portion of the main body 35 located from the bend line 52 to the front surface 44 may be provided in a planar type configuration including a raised or curled first corner 49, i.e., the corner defined by the front surface 44 and the first side surface 46, including a raised contact surface area 37 operationally configured to diminish or otherwise prevent catching or digging of the first side surface 46 into an operating surface 200 upon contact—the curvature of the first corner 49 providing or improving slidability to the contact surface of the device 5 as the device 5 contacts an operating surface 200 when the corresponding motorcycle 100 is in forward motion.

In one embodiment, the device 5 may be provided as a one piece construction. Thus, the device 5 may be constructed via machining, via a mold or the like. In another embodiment, the device 5 may be provided as an assembly of parts. As such, the device 5 may be assembled from parts of like or dissimilar materials of construction. In still another embodiment, the device 5 may be produced using 3-D printing technology as understood by the skilled artisan.

Suitably, the device 5 may be constructed from one or more materials durable enough to operate as a deflective device for motorcycles 100. More particularly, the device 5 may be constructed from one or more materials including but not necessarily limited to those materials resistant to chipping, cracking, excessive bending and reshaping as a result of ozone, weathering, heat, moisture, other outside mechanical and chemical influences, as well as various impacts and other loads placed on the device 5. Likewise, the device 5 may comprise any color or combination of colors. As such, the device 5 may include materials of construction comprising one or more colors and/or color patterns and/or may be painted, stained or powder coated as desired or as may otherwise be required. For example, the device 5 may include one or more fluorescent colors and/or reflective coating materials. In another embodiment, the device 5 may be chrome plated. In addition, the device 5 may have a smooth outer surface, a partially smooth outer surface, an unsmooth outer surface, an abrasive outer surface, or an irregular outer surface.

Suitable materials of construction of the device 5 may include, but are not necessarily limited to metals, plastics, rubbers, woods, plexiglass, polytetrafluoroethylene ("PTFE"), composite materials, and combinations thereof. Suitable plastics include, but are not necessarily limited to, polyolefins such as polyethylene, polypropylene, polyoutylene, polyhexylene, polystyrene, polyalphamethylstyrene, and the like or copolymers thereof, acrylics, urethanes, polyesters, thermoplastics, thermal setting resins, thermoplastic elastomers, liquid crystal polymers, polyalkyleneoxides, or any other structural plastic suitable for making a durable device 5. Suitable metals may include, but are not necessarily limited to aluminum and its alloys such as aluminum-magnesium alloys and the like, titanium, steel and other iron alloys, copper and its alloys such as bronze, brass and the like, and any other metal or its alloys as desired, and combinations thereof. Non-limiting examples of aluminum include forged aluminum, 6061-T6 Billet Aluminum, and combinations thereof. Steels may be defined herein as a large family of metal alloys in which iron is mixed with carbon and other elements, and may be described as mild, medium or high-carbon steels according to the percentage of carbon they contain. Some exemplary types of steel that may be used herein include, but are not necessarily limited to carbon steel, stainless steel, and combinations thereof. One particular type of steel includes 1020 steel as understood by the skilled artisan.

Suitable composite materials include, but are not necessarily limited to polymer matrices selected from the plastics listed above reinforced by a fiber such as carbon fibers, polyamides such as DuPont™ Kevlar®, boron-nitride fibers, glass fibers, and combinations thereof. The device 5 may also include an outer surface finish as desired. Without limiting the invention, one suitable plastic device 5 may include an outer surface finish of SPI B3 or better, as such is understood by the skilled artisan with knowledge of the Society of the Plastics Industry's Finishing Guide (see http://www.plasticsindustry.org/).

The device 5 may be provided with an outer surface appearance the same or substantially similar as one or more particular primary covers 110. For example, in an embodiment where a primary cover 110 includes a gloss black anodized finish on its outer surface, a device 5 may include the same or substantially similar gloss black anodized finish.

Figure 38:
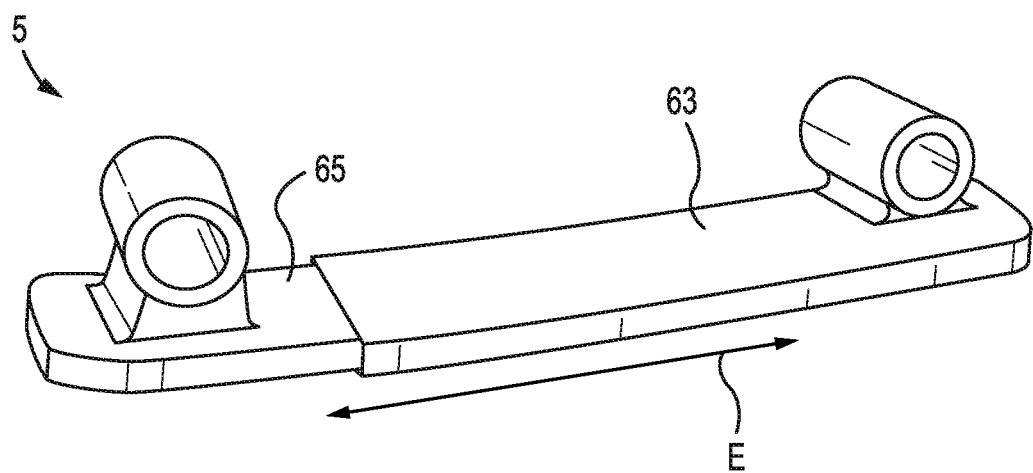
FIG. 38 is a perspective view of another embodiment of a lean angle indication device of this disclosure.
Figure 39:
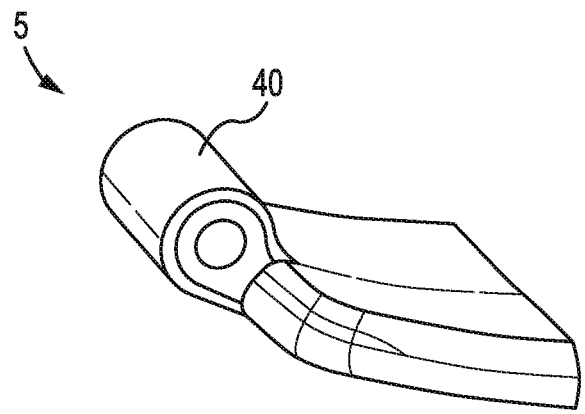
FIG. 39 is a perspective view of another embodiment of a lean angle indication device of this disclosure.
Figure 40:
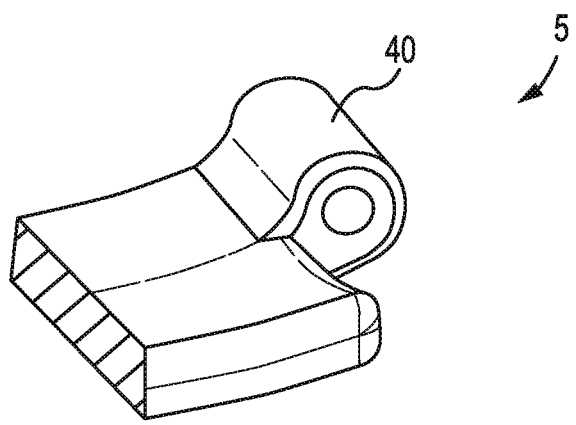
FIG. 40 is a perspective view of another embodiment of a lean angle indication device of this disclosure.

In still another embodiment, a device 5 may be adjustable to reposition the opposing fastener reinforcement members 40 to accommodate two or more particular primary covers 110—see the device 5 of FIG. 38, including an outer member 63 and an inner member 65 slidable within the first outer member 63 (see Arrow E). In another embodiment, a device 5 may be provided with a single fastener reinforcement member 40 as shown in the simplified embodiments of FIGS. 39 and 40.

Figure 45:
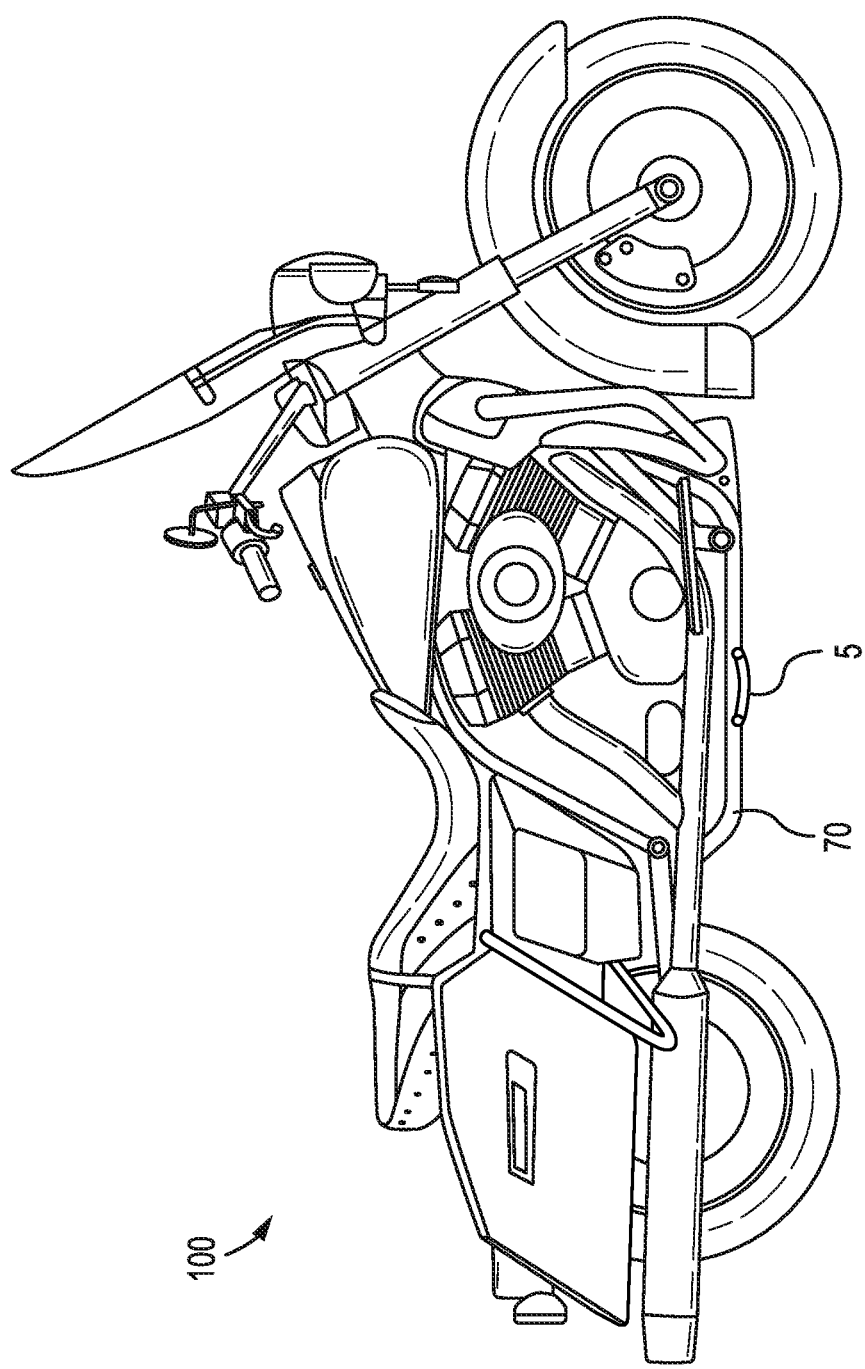
FIG. 45 is a right side view of a non-limiting example of a motorcycle including a lean angle indication device releasably attached to the frame of the motorcycle.

As shown in FIG. 45, one or more devices 5 may also be releasably attached on a right side of a motorcycle 100 effective as a lean angle indicator(s) for leaning of the motorcycle 100 in a right lean direction from a vertical position—a direction opposite from the direction as shown in FIG. 1. In this embodiment, one or more devices 5 may be releasably attached to a frame 70 along a right side of a motorcycle 100 via one or more threaded fasteners mating with fastener holes disposed along the frame 70. In another embodiment, one or more devices 5 may also be releasably attached to a frame 70 along a left side of a motorcycle 100. The inclusion of one or more devices 5 on both the left and right sides of a motorcycle 100 provides for lean angle indication on both sides of the motorcycle 100. In another embodiment, one or more devices 5 may be releasably attached to a right side and/or left side of a motorcycle 100 via one or more clamps including, but not necessarily limited to conduit clamps, C-type grounding clamps, and combinations thereof. For example, a conduit clamp may be releasably attached to opposing fastener reinforcement members 40 of a device 5 for securing the device 5 to a motorcycle 100.

As described above, a contact lean angle for a particular motorcycle 100 may be determined according to the size and/or shape and/or location of one or more components located along or near the lowermost part of a motorcycle 100. For example, where one or more factory components of a motorcycle 100 are replaced by one or more after-market components, one or more after-market components may include a size and/or shape different than the one or more factory components thereby altering the contact lean angle of a motorcycle 100. Another factor that may dictate a contact lean angle for a particular motorcycle 100 includes raising or lowering of the frame of a motorcycle 100.

In one embodiment, a contact lean angle for a motorcycle 100 as used by the general public (see FIG. 2) typically realizes a contact lean angle when a footboard 105, or a footboard bracket 106 depending on the make and/or model of motorcycle 100, contacts an operating surface 200 on either side of the motorcycle 100. A contact lean angle of a motorcycle 100 as commonly used by the general public may be referred to as an "initial contact lean angle" of a particular motorcycle 100. Where the same motorcycle 100 is used for competition riding, the contact lean angle of the motorcycle 100 may be increased beyond the initial contact lean angle by purposefully wearing or grinding off parts of one or more components, e.g., a bottom part of a footboard 105 and/or footboard bracket 106 and/or a kickstand housing 112, to provide a "competition contact lean angle" of the motorcycle 100. Without limiting the disclosure, in an embodiment including a motorcycle 100 as shown in FIG. 2 a change in lean angle from an initial contact lean angle to a competition contact lean angle may range from or about 4.0 degrees to or about 6.0 degrees.

In one embodiment, when a motorcycle 100 realizes a competition contact lean angle, one or more additional components may contact an operating surface 200 in unison with the footboard 105 and/or footboard bracket 106 and/or kickstand housing 112 (see FIG. 3). Typically, a competition contact lean angle allows a motorcycle 100 to perform higher difficulty slow speed turning maneuvers compared to the same motorcycle 100 when set at a lesser initial contact lean angle. For example, a motorcycle 100 as shown in FIG. 2 for use by the general public at an initial contact lean angle may have a turn radius of or about 5.49 meters (18.0 feet) and the same motorcycle 100 at a competition contact lean angle may have a turn radius of or about 4.42 meters (14.5 feet).

In operation, a device 5 as described above may be operationally configured to develop, train or teach motorcyclists 3 to identify a target lean angle including an operable maximum lean angle of a motorcycle 100 as shown in FIG. 4, when practicing or otherwise executing turning maneuvers, e.g., slow speed motorcycle turns and U-turn maneuvers at or about 20.0 mph or less. As stated above, a motorcycle 100 as shown in FIGS. 2-4 typically weighs about 500.0 pounds or more and motorcyclists 3 learning to operate motorcycles 100 at such weights are often hesitant to lean the motorcycle 100 a lean angle necessary to accomplish a particular turning maneuver as people are often afraid to drop and damage the motorcycle 100 and/or are often fearful of personal injury. Due to such hesitancy, most motorcyclists 3 learning to operate a motorcycle 100 as shown in FIGS. 2-4 are initially unaware of just how far a motorcycle 100 can be leaned to the right and to the left from a vertical position without dropping the motorcycle 100 when performing a slow speed turn maneuver. A device 5 of this disclosure may be releasably attached to a motorcycle 100 in a manner effective to train or teach a motorcyclist 3 to lean a motorcycle 100 beyond a lesser lean angle realized as a result of hesitancy down to a greater operable target lean angle, including an operable maximum lean angle, according to when the device 5 contacts an operating surface 200. In other words, when a motorcyclist 3 hears and/or feels the device 5 contact an operating surface 200, e.g., scrape against an operating surface 200, in real time, such event signals to the motorcyclist 3 that his/her motorcycle 100 has realized an operable target lean angle.

In one embodiment, a device 5 of this disclosure may be operationally configured to train or teach motorcyclists 3 to learn or otherwise identify an operable maximum lean angle according to an initial contact lean angle of a motorcycle 100. In another embodiment, a device 5 may be operationally configured to train or teach motorcyclists 3 to learn or otherwise identify an operable maximum lean angle according to a competition contact lean angle of a motorcycle 100. In another embodiment when training a beginner, novice or intermediate motorcyclist 3, one or more devices 5 may be employed to train or teach the motorcyclist 3 to first identify an operable maximum lean angle according to an initial contact lean angle. Over time, one or more different devices 5 may be employed to train or teach the motorcyclist 3 to identify one or more additional target lean angles until a final operable maximum lean angle is realized according to a competition contact lean angle. In still another embodiment, one or more devices 5 may be employed to train or teach the motorcyclist 3 to identify an operable maximum lean angle according to an initial contact lean angle of a motorcycle 100, thereafter, the one or more devices 5 may be manipulated or reconfigured, e.g., bent in shape, to train or teach the motorcyclist 3 to identify one or more target lean angles and/or an operable maximum lean angle according to a competition contact lean angle.

With attention to Arrow B in FIG. 11, a deflection gap of a device 5 for use in training or teaching a motorcyclist 3 to learn or otherwise identify an operable maximum lean angle according to an initial contact lean angle of a motorcycle 100 is greater than a deflection gap of a device 5 for use in training or teaching a motorcyclist 3 to learn or otherwise identify an operable maximum lean angle according to a competition contact lean angle on the same motorcycle 100. As such, in an embodiment comprising a plurality of devices 5 for adjusting a target lean angle of a motorcycle 100 incrementally over time, the plurality of devices 5 may be similar in size and shape but each may include a bend effective to produce a different deflection gap during use. In one non-limiting example, a plurality of devices 5 may be employed wherein each device 5 changes the target lean angle of a motorcycle 100 in increments of or about 1.0 degree from a vertical position. In another non-limiting example, a plurality of devices 5 may be employed wherein each device 5 changes the target lean angle of a motorcycle 100 in increments of or about 5.0 degrees from a vertical position. For example, a first device 5 of a plurality of devices 5 may be operationally configured to direct a motorcycle 100 in a target lean direction 5.0 degrees from a vertical position and a second device may be operationally configured to direct a motorcycle 100 in a target lean direction 10.0 degrees from a vertical position of a motorcycle 100. Additional devices 5 may be employed until an operable maximum lean angle is realized, e.g., contacting an operating surface 200 at 15.0 degrees, 20.0 degrees, 25.0 degrees, 30.0 degrees, from a vertical position of a motorcycle 100. In another embodiment, the main body 35 of a plurality of devices 5 may be provided in differing thicknesses effective to produce differing deflection gaps during use. Other increments of degree are herein contemplated as desired.

The disclosure will be better understood with reference to the following non-limiting examples, which are illustrative only and not intended to limit the present invention to a particular embodiment.

EXAMPLE 1

Figure 41:
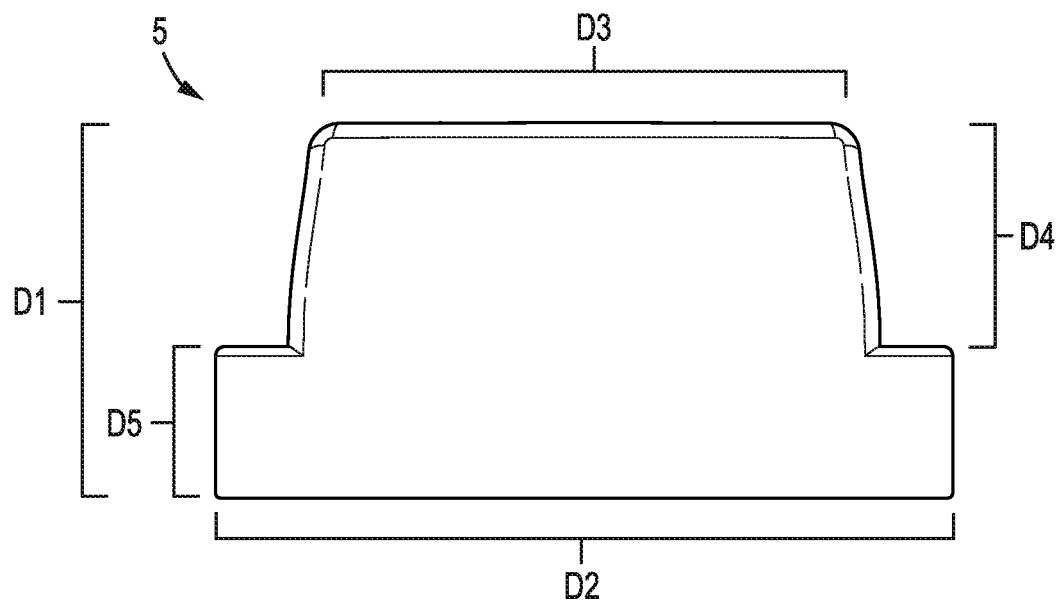
FIG. 41 is a bottom view of the lean angle indication device of FIG. 13.
Figure 42:
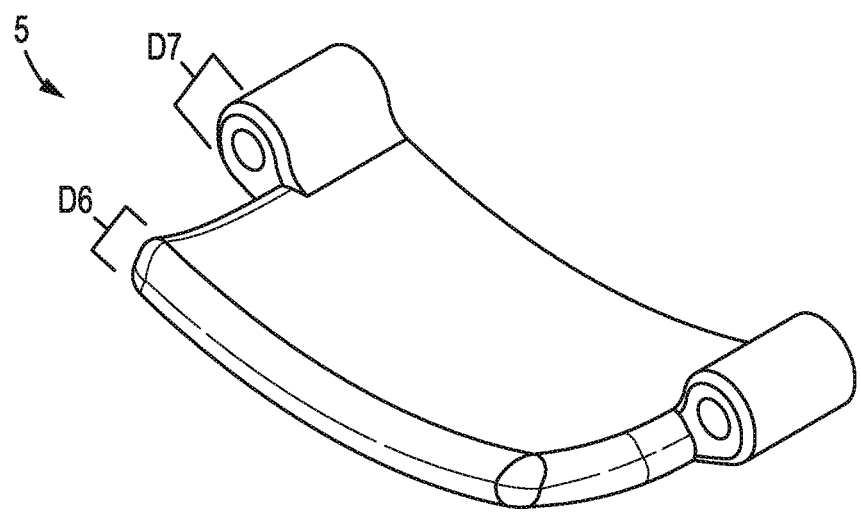
FIG. 42 is a perspective top view of the lean angle indication device of FIG. 13.

In a first non-limiting example, with reference to FIGS. 41-42, a device 5 as described in FIGS. 13-19 for use with a primary cover 110 of a 2020 ROAD KING® Harley-Davidson motorcycle (see https://www.harley-davidson.com) may have the following dimensions:
D1: 63.5 mm (2.5 inches);
D2: 122.9 mm (4.84 inches);
D3: 91.7 mm (3.61 inches);
D4: 36.6 mm (1.44 inches);
D5: 27.9 mm (1.1 inches);
D6: 9.1 mm (0.36 inches);
D7: 17.1 mm (0.675 inches).

EXAMPLE 2

Figure 43:
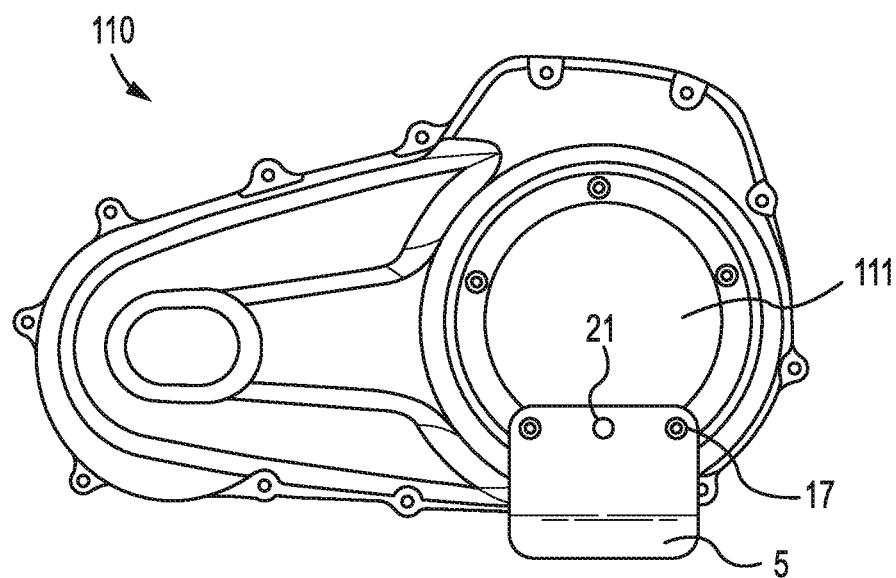
FIG. 43 depicts another embodiment of a lean angle indication device of this disclosure attached to an exemplary outer primary cover of a motorcycle.

In reference to FIG. 43, in a second non-limiting example, a device 5 may be operationally configured to releasably attach to a derby cover 111. In one embodiment, the device 5 may be provided as a planar member. In another embodiment, the device 5 may be provided as a non-planar member as shown. The device 5 of this embodiment includes one or more fastener holes 21 that correspond to one or more fastener holes 14 of the primary cover 110 (see FIG. 7) whereby the device 5 may be secured to the primary cover 110 via one or more fasteners 17 as shown.

In another embodiment, one or more holes may be formed in the body of the derby cover 111 according to a desired placement of a device 5 thereby providing fastener holes for receiving one or more fasteners 17 in a manner effective to secure a device 5 to a derby cover 111 in a fixed position.

EXAMPLE 3

Figure 44:
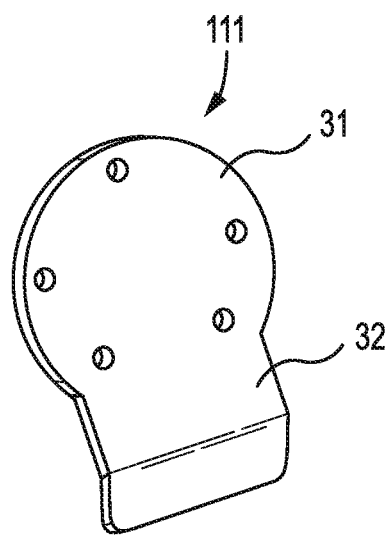
FIG. 44 is a perspective view of an embodiment of a derby cover of this disclosure for use with an outer primary cover of a motorcycle.

In reference to FIG. 44, in a third non-limiting example, a derby cover 111 may be provided including a circular member 31 and a guard member 32 extending from the circular member 31 for protecting a portion of a corresponding primary cover 110. The guard member 32 may be provided as a planar member or as a non-planar member as shown.

EXAMPLE 4

In a fourth non-limiting example, a motorcycle 100 may include one or more devices 5 releasably attached to the left side of a motorcycle 100 and one or more devices 5 releasably attached to the right side of a motorcycle 100 as shown in FIG. 45. In an embodiment of a motorcycle 100 as shown in FIG. 2 e.g., a 2020 ROAD KING® Harley-Davidson motorcycle or the like, the left side of the motorcycle 100 may include a contact lean angle of or about twenty-nine degrees (29.0) and a contact lean angle on a tight side of or about thirty-one (31.0) degrees. As such, a device 5 of this disclosure may include an operable maximum lean angle on a left side of the motorcycle 100 including a first left lean angle of or about 28.0 degrees to a second left lean angle of or about 26.0 degrees and an operable maximum lean angle on a right side of the motorcycle 100 including a first right lean angle of or about 30.0 degrees to a second right lean angle of or about 28.0 degrees.

EXAMPLE 5

Figure 46:
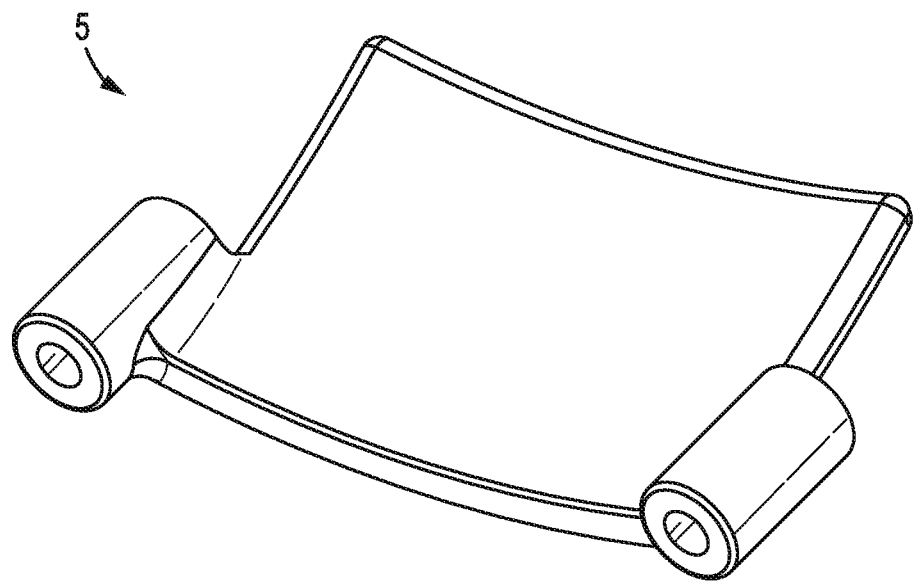
FIG. 46 is a perspective view of another embodiment of a lean angle indication device of this disclosure.
Figure 47:
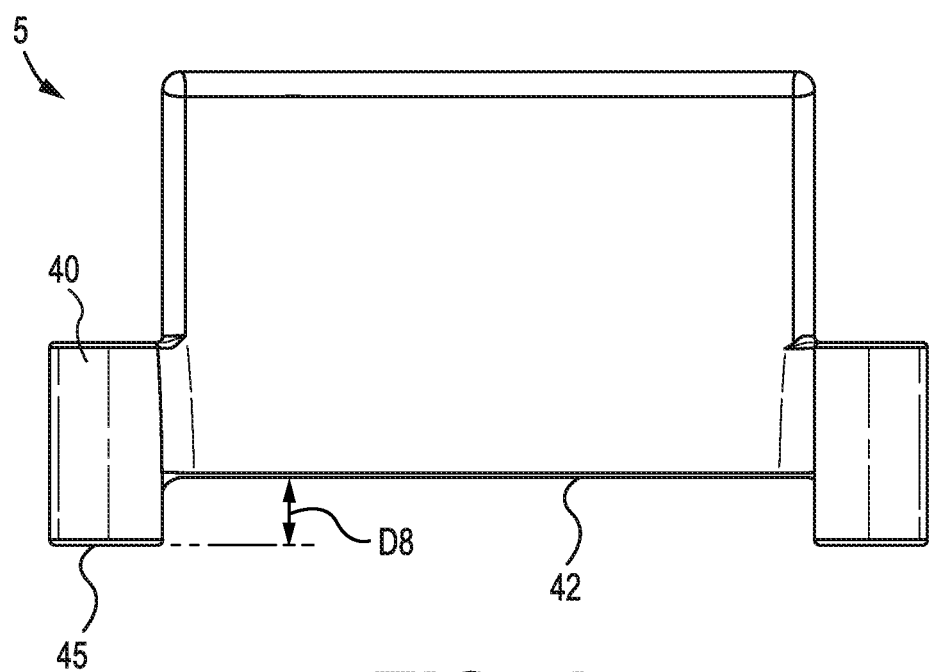
FIG. 47 is a top view of the lean angle indication device of FIG. 46.

In a fifth non-limiting example, a device 5 as shown in FIGS. 46 and 47 may be provided for use with a motorcycle 100 as shown in FIG. 2. In this embodiment, and although the device 5 may be built to scale, the rear surface 45 of the fastener reinforcement members 40 may extend out from the rear surface 42 of the main body 35 a distance of or about 953 mm (0.375 inches)—see dimension D8 in FIG. 47.

Although the disclosure is described above in terms of various exemplary embodiments and implementations, it should be understood that the various features and functionality described in one or more of the individual embodiments are not limited in their applicability to the particular embodiment with which they are described, but instead might be applied, alone or in various combinations, to one or more other embodiments whether or not such embodiments are described and whether or not such features are presented as being a part of a described embodiment. Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like.

Persons of ordinary skill in the art will recognize that many modifications may be made to the present disclosure without departing from the spirit and scope of the disclosure. The embodiment(s) described herein are meant to be illustrative only and should not be taken as limiting the disclosure, which is defined in the claims.

I claim:

1. A system comprising:
a deflective device for a motorcycle; and
one or more threaded fasteners configured to releasably attach the deflective device to the motorcycle;
wherein the deflective device includes:
a main body (35);
a first tubular fastener member (40) disposed on a first side of the main body (35);
a second tubular fastener member (40) disposed on a second side of the main body (35);
wherein the main body (35) comprises:
a base body section (300) disposed between the first tubular fastener member (40) and the second tubular fastener member (40); and
a deflective body section (310) extending out from the base body section (300); and
wherein the first tubular fastener member (40) has an opening (41) comprising a central axis (33) for receiving one of the one or more threaded fasteners there through and the second tubular fastener member (40) has an opening (41) comprising a central axis (33) for receiving one of the one or more threaded fasteners there through; and wherein each of the one or more threaded fasteners comprises a first length and wherein the opening (41) of the first tubular fastener member (40) and the opening (41) of the second tubular fastener member (40) each comprise a second length at least 50.0 percent the first length.

2. The system of claim 1 wherein the main body (35) includes a curved outer surface and a curved inner surface.

3. The system of claim 1 wherein the one or more threaded fasteners comprise one or more Allen head bolts.

4. The system of claim 1 wherein the main body (35) includes a rear surface (42) and a front surface (44).

5. The system of claim 4 wherein a distance from the rear surface (42) to the front surface (44) comprises a third length and wherein the first tubular fastener member (40) and the second tubular fastener member (40) each comprise a fourth length from or about 20.0 percent to or about 50.0 percent the third length.

6. The system of claim 4 wherein a distance from the rear surface (42) to the front surface (44) comprises a third length and wherein the first tubular fastener member (40) and the second tubular fastener member (40) each comprise a fourth length about 40.0 percent the third length.

7. The system of claim 1 wherein the main body (35) includes an outer surface and an inner surface, and wherein when the deflective device is attached to the motorcycle, then the inner surface of the main body (35) is located apart from the motorcycle.

8. The system of claim 7 wherein the inner surface of the main body (35) is located apart from the motorcycle at a distance of or about 0.0625 inches to or about 2.0 inches.

9. The system of claim 7 wherein the main body (35) includes a curved outer surface and a curved inner surface.

10. A method of operating a motorcycle including a deflective device, the method comprising:
  contacting the deflective device with an operating surface of the motorcycle when the motorcycle leans a target lean angle in a target lean direction; and
  indicating that the motorcycle has realized the target lean angle via said contacting of the deflective device with the operating surface;
  wherein the deflective device comprises:
    a main body (35);
    a first tubular fastener member (40) disposed on a first side of the main body (35); and
    a second tubular fastener member (40) disposed on a second side of the main body (35);
    wherein the main body (35) comprises:
      a base body section (300) disposed between the first tubular fastener member (40) and the second tubular fastener member (40); and
      a deflective body section (310) extending out from the base body section (300).

\* \* \* \* \*